(12) United States Patent
Wasaki et al.

(10) Patent No.: US 6,987,430 B2
(45) Date of Patent: Jan. 17, 2006

(54) POWER LINE COMMUNICATION SYSTEM AND POWER LINE BRANCHING APPARATUS

(75) Inventors: Masaru Wasaki, Tokyo (JP); Hirotada Furukawa, Tokyo (JP); Yoshihiro Saitoh, Tokyo (JP); Mitsunari Suzuki, Tokyo (JP)

(73) Assignee: TDK Corporation, Tokyo (JP)

( * ) Notice: Subject to any disclaimer, the term of this patent is extended or adjusted under 35 U.S.C. 154(b) by 299 days.

(21) Appl. No.: 10/291,644

(22) Filed: Nov. 12, 2002

(65) Prior Publication Data

US 2003/0095036 A1 May 22, 2003

(30) Foreign Application Priority Data

Nov. 19, 2001 (JP) .............................. 2001-352853
Oct. 9, 2002 (JP) .............................. 2002-295614

(51) Int. Cl.
  *H03H 7/38* (2006.01)
(52) U.S. Cl. .................. 333/124; 333/100; 333/32; 333/129
(58) Field of Classification Search ............... 333/100, 333/32, 33, 124–126, 129, 132, 181; 340/310.03, 340/310.05, 310.06
See application file for complete search history.

(56) References Cited

U.S. PATENT DOCUMENTS

| 4,471,399 A | * | 9/1984 | Udren ...................... 361/64 |
| 4,903,006 A | * | 2/1990 | Boomgaard ............ 340/310.05 |
| 5,777,545 A | * | 7/1998 | Patel et al. ............ 340/310.06 |
| 5,777,769 A | | 7/1998 | Coutinho |
| 5,805,053 A | * | 9/1998 | Patel et al. ............ 340/310.01 |
| 5,952,914 A | * | 9/1999 | Wynn .................... 340/310.01 |
| 6,747,859 B2 | * | 6/2004 | Walbeck et al. ........... 361/93.1 |
| 2003/0052771 A1 | | 3/2003 | Enders et al. |

FOREIGN PATENT DOCUMENTS

| FR | 2 707 817 | 1/1995 |
| JP | 52-157710 U | 11/1977 |
| JP | 59-37833 U | 3/1984 |
| JP | 61-278221 A | 12/1986 |
| JP | 08-032495 A | 2/1996 |
| JP | 2000-244376 | 9/2000 |
| JP | A 2001-285150 | 10/2001 |
| JP | A 2002-217797 | 8/2002 |
| WO | WO 02/05451 A1 | 1/2002 |

* cited by examiner

*Primary Examiner*—Robert Pascal
*Assistant Examiner*—Kimberly Glenn
(74) *Attorney, Agent, or Firm*—Oliff & Berridge, PLC

(57) ABSTRACT

A power line communication system comprises an indoor power line and one or more power line branching apparatuses connected to the indoor power line. The power line branching apparatus comprises a communication channel that is branched off from the indoor power line and connectable to a power line communication device, and a power supply channel that is branched off from the indoor power line and connectable to electrical equipment. The power line branching apparatus further comprises an impedance matching circuit and a normal mode filter circuit. The impedance matching circuit is provided on the power supply channel, and sets the impedance of the indoor power line to a predetermined value. The normal mode filter circuit is provided on the power supply channel, and reduces normal mode noise occurring from the electrical equipment connected to the power supply channel.

28 Claims, 14 Drawing Sheets

POWER LINE COMMUNICATION SYSTEM AND POWER LINE BRANCHING APPARATUS

BACKGROUND OF THE INVENTION

1. Field of the Invention

The invention relates to a power line communication system for performing communication between a plurality of devices by using a power line as a signal transmission channel, and to a power line branching apparatus for use in this power line communication system.

2. Description of the Related Art

In recent years, information communication at home is growing in need for the purposes of sharing peripheral equipment of computers, sharing information including documents, still pictures and moving pictures, and games, the Internet, and so on. Communication networks are thus in demand not only at offices but also at ordinary households.

These days, for communication technology to be used in constructing a communication network at home, power line communication technology is viewed as promising and is being developed. The power line communication technology utilizes a power line as a signal transmission channel. This technology makes it possible to perform communication between a plurality of communication devices by connecting each of those devices to a receptacle installed in each room in a house, for example. On the other hand, high speed communication technology at a high frequency band has been developed recently, and it is desired that a home communication network employing this high speed communication technology and the power line communication technology be put to practical use.

However, there arises a problem resulting from the fact that various types of electrical equipment is connected to an indoor power line that is to serve as the communication channel in power line communication. Specifically, the equipment connected to the indoor power line can generate noise or lowers an impedance of the power line, which can result in an increase in the error rate to cause communication failures in the power line communication.

Power line communication is typically performed by using normal mode signals. Therefore, in the power line communication, communication failures may occur from normal mode noise in particular among the noises generated by the electrical equipment.

It should also be noted that not every indoor power line is laid in an environment suitable for communication, because indoor power lines are not initially intended for use as communication channels. For example, impedance of indoor power lines varies due to the electrical equipment connected to the indoor power line, as mentioned above. Depending on the value of impedance of the indoor power line, signals may be reflected at connection points between the equipment for performing power line communication and the indoor power line, which results in signal deterioration.

In situations where no electrical equipment is connected to a connecting part for connecting electrical equipment to an indoor power line, such as receptacles, the connecting part makes an open termination, at which signals are reflected to thereby cause signal deterioration.

Published Unexamined Japanese Patent Application (KOKAI) 2001-285150 discloses a power line communication system for performing communication between a plurality of devices using a power line, in which a signal interrupting part is provided between an indoor power line and electrical equipment for blocking passage of signals for communication.

On the other hand, Published Unexamined Japanese Patent Application (KOKAI) 2002-217797 discloses a power line communication system in which an impedance matching circuit is provided between an indoor power line and communication equipment/electrical equipment, and an inductor for blocking passage of signals and noises is also provided between the indoor power line and the electrical equipment.

In a power line communication system, if no measure is taken against the impedance- or noise-related problems described above, communication failures can occur due to impedance variations and noises on the indoor power line.

The technique disclosed in Published Unexamined Japanese Patent Application (KOKAI) 2001-285150 is effective to reduce noise generated by electrical equipment. With this technique, however, it is impossible to set the impedance of the indoor power line to a desired value suitable for communication. Furthermore, even if this technique is employed, in situations where no electrical equipment is connected to the connecting part for connecting electrical equipment to the indoor power line, the connecting part makes an open termination at which signals are reflected. Thus, the technique disclosed in the above-mentioned publication document cannot eliminate the problem of signal deterioration.

The technique disclosed in Published Unexamined Japanese Patent Application (KOKAI) 2002-217797 makes it possible to set the impedance of the indoor power line to a desired value and to reduce noise generated by the electrical equipment. This technique, however, requires an impedance matching circuit to be located between the indoor power line and the communication equipment. The impedance matching circuit includes a resistor located between two conductive lines. Due to the impedance matching circuit located between the indoor power line and the communication equipment, the electric power of signals is consumed by the resistor and this makes the signals extremely weak.

OBJECTS AND SUMMARY OF THE INVENTION

It is a first object of the present invention to provide a power line communication system that makes it possible to perform communication between a plurality of communication devices by using an indoor power line, to avoid communication failures attributable to equipment connected to the indoor power line, and to improve the state of the indoor power line to make it suitable for communication.

It is a second object of the invention to provide a power line branching apparatus for branching an indoor power line to provide communication channels to devices that performs communication by using the indoor power line, and to provide power supply channels to equipment that requires electric power, the apparatus making it possible to avoid communication failures attributable to the equipment connected to the indoor power line, and to improve the state of the indoor power line to make it suitable for communication.

A power line communication system of the present invention allows communication between a plurality of communication devices by using an indoor power line. The system comprises: an indoor power line; a communication channel that is branched off from the indoor power line and connectable to a communication device for performing communication by using the indoor power line; a power supply channel that is branched off from the indoor power line and connectable to electrical equipment that requires electric power; an impedance matching circuit provided on the power supply channel, for setting an impedance of the indoor power line to a predetermined value; and a filter circuit provided on the power supply channel, for reducing noise occurring from the electrical equipment when the equipment is connected to the power supply channel.

According to the power line communication system of the invention, there are provided the communication channel and the power supply channel. The impedance matching circuit provided on the power supply channel adjusts the impedance of the indoor power line to a predetermined value. The filter circuit provided on the power supply channel reduces noise occurring from the electrical equipment when the equipment is connected to the power supply channel.

In the power line communication system of the invention, the filter circuit maybe located closer to the electrical equipment than the impedance matching circuit is.

In the power line communication system of the invention, the power supply channel may include two power supply lines, and the impedance matching circuit may include: a matching impedance element provided between the two power supply lines, for setting the impedance of the indoor power line to a predetermined value when the electrical equipment is not connected to the power supply channel; a high-pass filter element provided between the two power supply lines, being connected in series to the matching impedance element, for interrupting a frequency component of electric power carried by the indoor power line; and a variation-suppressing impedance element provided on at least either one of the power supply lines at a position closer to the electrical equipment than the matching impedance element and the high-pass filter element are, for suppressing variations in the impedance of the indoor power line resulting from connection of the electrical equipment to the power supply channel. In this case, the matching impedance element may be a resistor. Furthermore, the matching impedance element may have a function of preventing overheat resulting from an overcurrent or overpower.

In the power line communication system of the invention, the power supply channel may include two power supply lines, and the impedance matching circuit may include: a matching impedance element provided on at least either one of the power supply lines, for setting the impedance of the indoor power line to a predetermined value when the electrical equipment is not connected to the power supply channel, and suppressing variations in the impedance of the indoor power line resulting from connection of the electrical equipment to the power supply channel; and a high-pass filter element provided between the two power supply lines at a position closer to the electrical equipment than the matching impedance element is, for interrupting a frequency component of electric power carried by the indoor power line. In this case, the matching impedance element may be an inductor.

In the power line communication system of the invention, the power supply channel may include two power supply lines, and the filter circuit may include a shunt circuit provided between the two power supply lines, for reducing normal mode noise occurring from the electrical equipment when the equipment is connected to the power supply channel. In this case, the filter circuit may further include a noise-reducing inductor provided on at least either one of the power supply lines, for reducing normal mode noise occurring from the electrical equipment when the equipment is connected to the power supply channel.

In the power line communication system of the invention, the indoor power line may include a plurality of conductive lines and may be connected to an outdoor power line. The power line communication system may further comprise a blocking filter provided between the outdoor power line and the indoor power line, the blocking filter including a plurality of normal-mode-signal-reducing impedance elements for reducing normal mode signals, the normal-mode-signal-reducing impedance elements being connected in series to the respective conductive lines of the indoor power line and having an impedance higher than that of the indoor power line.

The blocking filter may further include a circuit that is provided between the plurality of conductive lines of the indoor power line, the circuit being made up of an impedance element and a high-pass filter element connected in series to each other, the impedance element setting the impedance of the indoor power line to a predetermined value, and the high-pass filter element interrupting a frequency component of electric power carried by the indoor power line. On the other hand, the blocking filter may further include a shunt circuit for reducing normal mode signals, the shunt circuit being provided between the plurality of conductive lines at a position closer to the outdoor power line than the normal-mode-signal-reducing impedance elements are. On the other hand, the blocking filter may further include a common mode filter circuit for reducing common mode noise.

The power line communication system of the invention may further comprise: a device connecting part to which the communication device is connected detachably, the device connecting part being provided at an end of the communication channel closer to the communication device; and an equipment connecting part to which the electrical equipment is connected detachably, the equipment connecting part being provided at an end of the power supply channel closer to the electrical equipment. In this case, the power line communication system may further comprise an accommodating member for accommodating the communication channel, the power supply channel, the impedance matching circuit, the filer circuit, the device connecting part, and the equipment connecting part. The power line communication system may further comprise a power line connecting part for connecting the communication channel and the power supply channel to the indoor power line detachably.

Where the power line communication system of the invention comprises the device connecting part and the equipment connecting part, the system may further comprise: a first accommodating member for accommodating the communication channel and the device connecting part; and a second accommodating member for accommodating the power supply channel, the impedance matching circuit, the filer circuit, and the equipment connecting part. The power line communication system may further comprise: a first power line connecting part for connecting the communication channel to the indoor power line detachably; and a second power line connecting part for connecting the power supply channel to the indoor power line detachably.

The power line communication system of the invention may further comprise a power line connecting part for connecting the communication channel and the power supply channel to the indoor power line detachably, and in this case, the communication channel, the power supply channel, the impedance matching circuit, and the filter circuit may be incorporated in electrical equipment, the electrical equipment including the communication device and requiring electric power.

A power line branching apparatus of the invention comprises: a communication channel that is branched off from an indoor power line and connectable to a communication device for performing communication by using the indoor power line; a power supply channel that is branched off from the indoor power line and connectable to electrical equipment that requires electric power; an impedance matching circuit provided on the power supply channel, for setting an impedance of the indoor power line to a predetermined value; and a filter circuit provided on the power supply channel, for reducing noise occurring from the electrical equipment when the equipment is connected to the power supply channel.

According to the power line branching apparatus of the invention, there are provided the communication channel and the power supply channel. The impedance matching circuit provided on the power supply channel adjusts the impedance of the indoor power line to a predetermined value. The filter circuit provided on the power supply channel reduces noise occurring from the electrical equipment when the equipment is connected to the power supply channel.

In the power line branching apparatus of the invention, the filter circuit may be located closer to the electrical equipment than the impedance matching circuit is.

In the power line branching apparatus of the invention, the power supply channel may include two power supply lines, and the impedance matching circuit may include: a matching impedance element provided between the two power supply lines, for setting the impedance of the indoor power line to a predetermined value when the electrical equipment is not connected to the power supply channel; a high-pass filter element provided between the two power supply lines, being connected in series to the matching impedance element, for interrupting a frequency component of electric power carried by the indoor power line; and a variation-suppressing impedance element provided on at least either one of the power supply lines at a position closer to the electrical equipment than the matching impedance element and the high-pass filter element are, for suppressing variations in the impedance of the indoor power line resulting from connection of the electrical equipment to the power supply channel. In this case, the matching impedance element may be a resistor. Furthermore, the matching impedance element may have a function of preventing overheat resulting from an overcurrent or overpower.

In the power line branching apparatus of the invention, the power supply channel may include two power supply lines, and the impedance matching circuit may include: a matching impedance element provided on at least either one of the power supply lines, for setting the impedance of the indoor power line to a predetermined value when the electrical equipment is not connected to the power supply channel, and suppressing variations in the impedance of the indoor power line resulting from connection of the electrical equipment to the power supply channel; and a high-pass filter element provided between the two power supply lines at a position closer to the electrical equipment than the matching impedance element is, for interrupting a frequency component of electric power carried by the indoor power line. In this case, the matching impedance element may be an inductor.

In the power line branching apparatus of the invention, the power supply channel may include two power supply lines, and the filter circuit may include a shunt circuit provided between the two power supply lines, for reducing normal mode noise occurring from the electrical equipment when the equipment is connected to the power supply channel. In this case, the filter circuit may further include a noise-reducing inductor provided on at least either one of the power supply lines, for reducing normal mode noise occurring from the electrical equipment when the equipment is connected to the power supply channel.

The power line branching apparatus of the invention may further comprise: a device connecting part to which the communication device is connected detachably, the device connecting part being provided at an end of the communication channel closer to the communication device; and an equipment connecting part to which the electrical equipment is connected detachably, the equipment connecting part being provided at an end of the power supply channel closer to the electrical equipment. In this case, the power line branching apparatus may further comprise an accommodating member for accommodating the communication channel, the power supply channel, the impedance matching circuit, the filer circuit, the device connecting part, and the equipment connecting part. The power line branching apparatus may further comprise a power line connecting part for connecting the communication channel and the power supply channel to the indoor power line detachably.

Where the power line branching apparatus of the invention comprises the device connecting part and the equipment connecting part, the apparatus may further comprise: a first accommodating member for accommodating the communication channel and the device connecting part; and a second accommodating member for accommodating the power supply channel, the impedance matching circuit, the filer circuit, and the equipment connecting part. The power line branching apparatus may further comprise: a first power line connecting part for connecting the communication channel to the indoor power line detachably; and a second power line connecting part for connecting the power supply channel to the indoor power line detachably.

The power line branching apparatus of the invention may further comprise a power line connecting part for connecting the communication channel and the power supply channel to the indoor power line detachably, and in this case, the communication channel, the power supply channel, the impedance matching circuit, and the filter circuit may be incorporated in electrical equipment, the electrical equipment including the communication device and requiring electric power.

Other objects, features and advantages of the invention will be sufficiently apparent from the following description.

DETAILED DESCRIPTION OF THE PREFERRED EMBODIMENTS

Embodiments of the invention will now be described in detail with reference to the drawings.

[First Embodiment]

Figure 1:
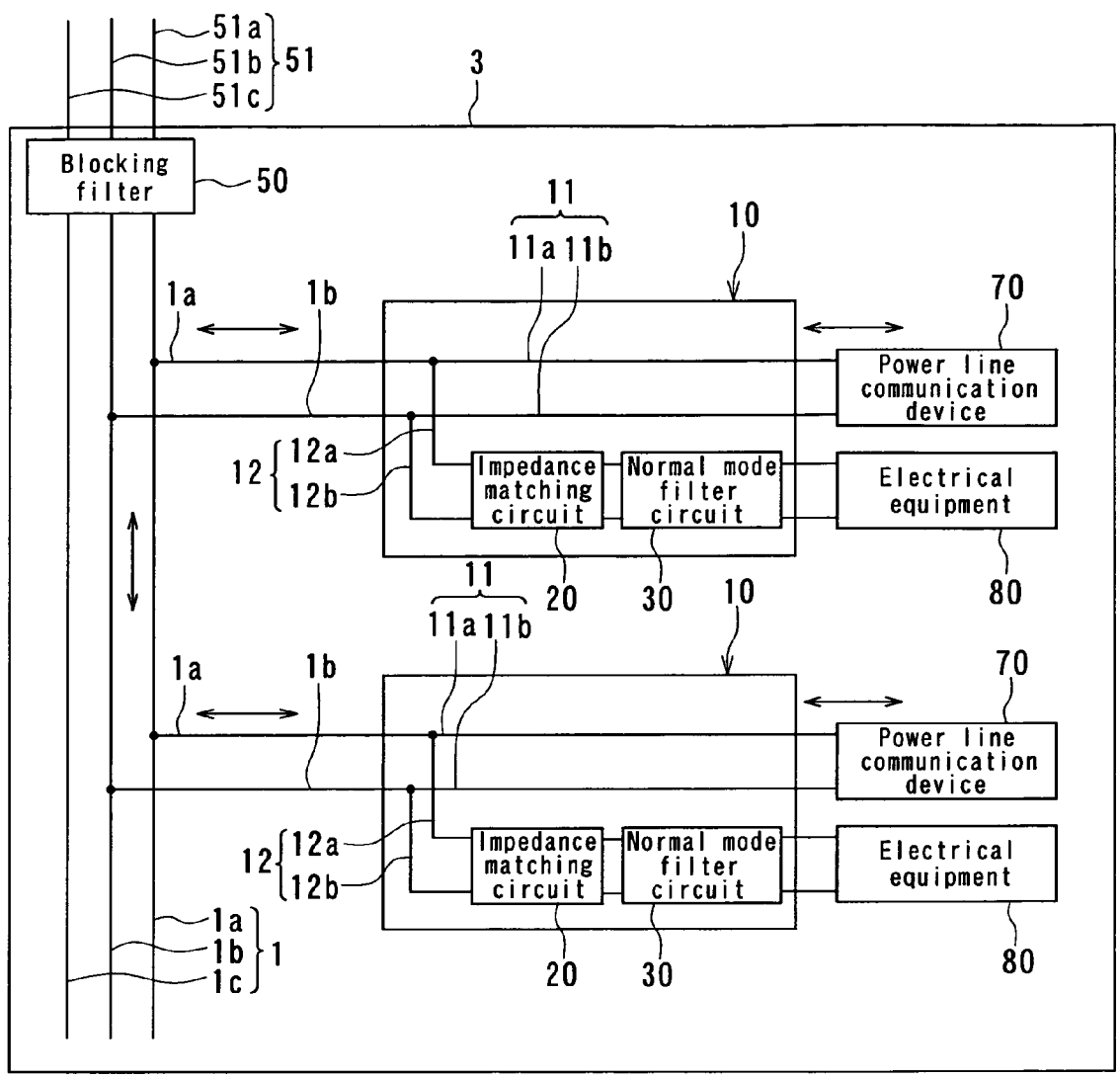
FIG. 1 is a block diagram showing a configuration of a power line communication system according to a first embodiment of the invention.

First, description will be given of a power line communication system and a power line branching apparatus according to a first embodiment of the invention. FIG. 1 is a block diagram showing a configuration of the power line communication system according to the first embodiment. As shown in FIG. 1, the power line communication system of the first embodiment comprises: an indoor power line 1; one or more power line branching apparatuses 10 of the embodiment connected to the indoor power line 1; and a blocking filter 50 connected to the indoor power line 1. The indoor power line 1 is connected to an outdoor power line 51 through the blocking filter 50. A power line communication device 70 for performing power line communication by using the indoor power line 1, and electrical equipment 80 that requires electric power carried by the indoor power line 1 are connectable to the power line blanching apparatus 10. In FIG. 1, the reference numeral 3 represents the interior.

The power line branching apparatus 10 comprises: a communication channel 11 that is branched off from the indoor power line 1 and connectable to the power line communication device 70; a power supply channel 12 that is branched off from the indoor power line 1 and connectable to the electrical equipment 80; an impedance matching circuit 20 that is provided in the power supply channel 12 and sets the impedance of the indoor power line 1 to a predetermined value; and a normal mode filter circuit 30 that is provided in the power supply channel 12 and reduces normal mode noise occurring from the electrical equipment 80 when the equipment 80 is connected to the power supply channel 12. The normal mode filter circuit 30 is located closer to the electrical equipment 80 than the impedance matching circuit 20 is.

The indoor power line 1 includes, for example, three conductive lines 1a, 1b, and 1c. The outdoor power line 51 includes, for example, three conductive lines 51a, 51b, and 51c that are connected to the conductive lines 1a, 1b, and 1c of the indoor power line 1, respectively. The power lines 1 and 51 are of single-phase three-line system, for example. In this case, the conductive lines 1b and 51b are neutral lines. The conductive lines 1a and 1b of the indoor power line 1 are connected to the power line branching apparatus 10. The conductive lines 1a and 1b carry electric power of a predetermined voltage and a predetermined frequency. The communication channel 11 includes two communication lines 11a and 11b connected to the conductive lines 1a and 1b, respectively. The power supply channel 12 includes two power supply lines 12a and 12b connected to the conductive lines 1a and 1b, respectively.

Figure 2:
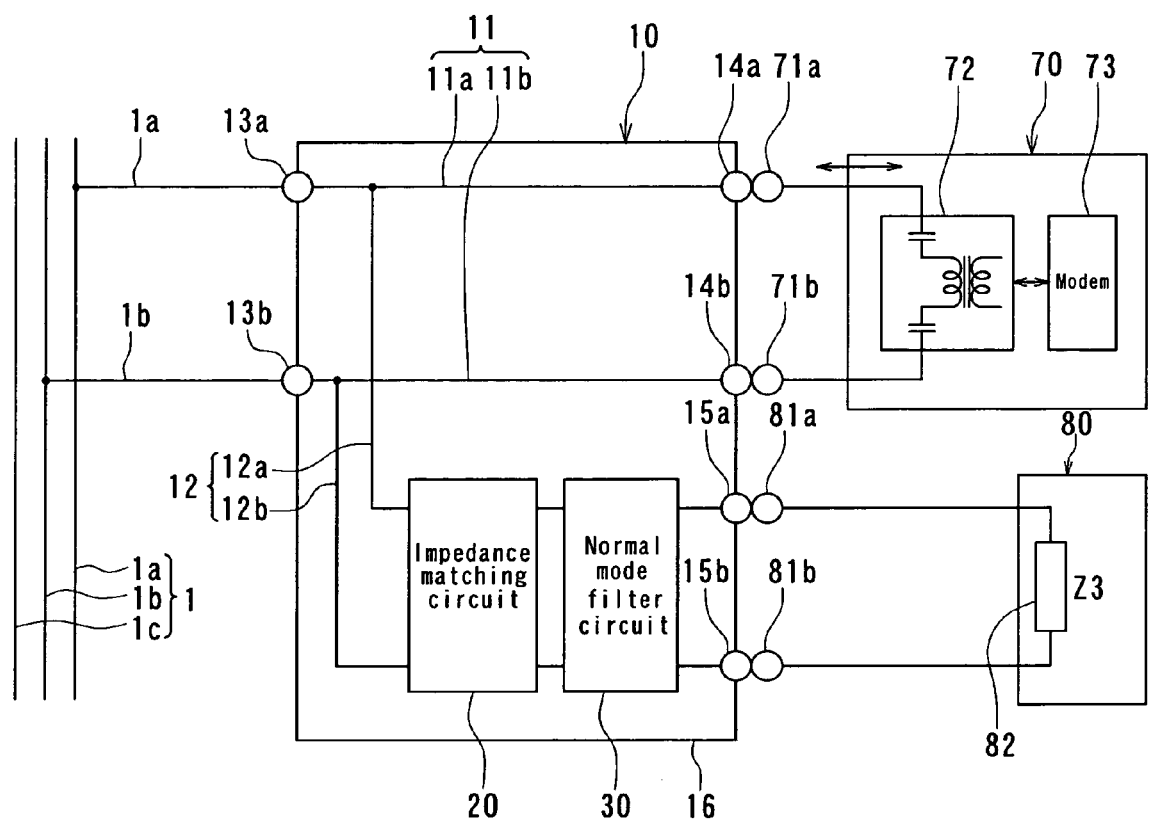
FIG. 2 is a circuit diagram showing a power line branching apparatus according to the first embodiment of the invention and the periphery thereof.

FIG. 2 is a circuit diagram showing the power line branching apparatus 10 according to the present embodiment and the periphery thereof. As shown in FIG. 2, the power line branching apparatus 10 of the embodiment comprises: connecting parts 13a and 13b connected to the conductive lines 1a and 1b of the indoor power line 1, respectively; device connection terminals 14a and 14b to which the power line communication device 70 is connected detachably; and equipment connection terminals 15a and 15b to which the electrical equipment 80 is connected detachably, as well as the above-described communication channel 11, the power supply channel 12, the impedance matching circuit 20, and the normal mode filter circuit 30. The device connection terminals 14a and 14b correspond to the device connecting part of the invention. The equipment connection terminals 15a and 15b correspond to the equipment connecting part of the invention.

The power line branching apparatus 10 further comprises a accommodating member 16 for accommodating the communication channel 11, the power supply channel 12, the impedance matching circuit 20, the normal mode filter circuit 30, the device connection terminals 14a and 14b, and the equipment connection terminals 15a and 15b. The accommodating member 16 may be a case for encasing the foregoing elements, or a plate-like member to which the foregoing elements are to be attached.

One end of the communication line 11a is connected to the connecting part 13a, and the other end is connected to the device connection terminal 14a. One end of the communication line 11b is connected to the connecting part 13b, and the other end is connected to the device connection terminal 14b.

One end of the power supply line 12a is connected to the connecting part 13a, and the other end is connected to the equipment connection terminal 15a. One end of the power supply line 12b is connected to the connecting part 13b, and the other end is connected to the equipment connection terminal 15b.

The equipment connection terminals 15a and 15b have the same structure as that of an ordinary receptacle intended for power supply. The device connection terminals 14a and 14b may have any structure. Although FIG. 2 shows that a pair of device connection terminals 14a and 14b are provided, there may be provided a plurality of pairs of device connection terminals 14a and 14b connected in parallel. Likewise, although FIG. 2 shows that a pair of equipment connection terminals 15a and 15b are provided, there may be provided a plurality of pairs of equipment connection terminals 15a and 15b connected in parallel.

The power line communication device 70 comprises connection terminals 71a and 71b that are detachably connected to the device connection terminals 14a and 14b of the power line branching apparatus 10, respectively. The power line communication device 70 further comprises, for example, a pulse transformer 72 connected to the connection terminals 71a and 71b, and a modem 73, as a signal processing circuit, connected to the pulse transformer 72.

The electrical equipment 80 comprises connection terminals 81a and 81b that are detachably connected to the equipment connection terminals 15a and 15b of the power line branching apparatus 10, respectively. The connection terminals 81a and 81b have the same structure as that of a plug to be inserted to an ordinary receptacle intended for power supply. The electrical equipment 80 shall have a load 82 of Z3 in impedance.

Figure 3:
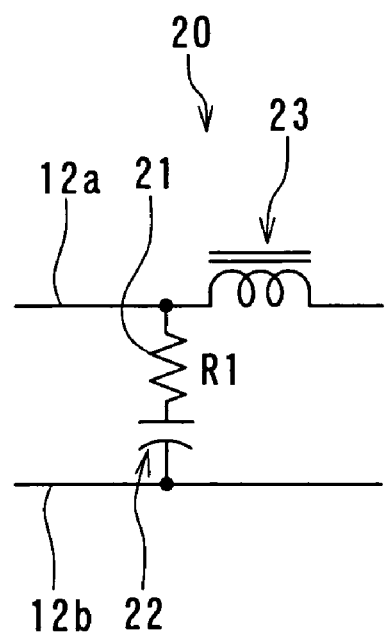
FIG. 3 is a circuit diagram showing an example of a configuration of the impedance matching circuit shown in FIG. 2.

FIG. 3 is a circuit diagram showing an example of a configuration of the impedance matching circuit 20. The impedance matching circuit 20 shown in FIG. 3 includes a matching impedance element 21, a high-pass filter element 22, and a variation-suppressing impedance element 23. The matching impedance element 21 is provided between the two power supply lines 12a and 12b, for setting the impedance of the indoor power line 1 to a predetermined value when the electrical equipment 80 is not connected to the power supply channel 12. The high-pass filter element 22 is provided between the two power supply lines 12a and 12b, being connected in series with the matching impedance element 21. The high-pass filter element 22 interrupts frequency components of electric power carried by the indoor power line 1. The variation-suppressing impedance element 23 is provided on at least either one of the power supply lines, such as the power supply line 12a, at a position closer to the electrical equipment 80 than the matching impedance element 21 and the high-pass filter elements 22 are, and suppresses variations in the impedance of the indoor power line 1 resulting from connection of the electrical equipment 80 to the power supply channel 12.

The matching impedance element 21 has an impedance R1 that is nearly equal to a predetermined value Z, a desired value of impedance of the indoor power line 1. For example, a desired value of impedance of the indoor power line 1 is a value equal to the characteristic impedance of the indoor power line 1. The matching impedance element 21 is a resistor, for example. The high-pass filter element 22 is a capacitor, for example. The impedance of the high-pass filter element 22 is set at a sufficiently small value within the communication band. The variation-suppressing impedance element 23 is an inductor, for example. Here, assuming that L1 is the inductance of the inductor and f is a frequency within the communication band, the inductance L1 shall be set to satisfy the following expression (1):

$$Z2 = 2\pi \times f \times L1 > Z. \quad (1)$$

In the impedance matching circuit 20 shown in FIG. 3, the high-pass filter element 22 interrupts frequency components of electric power carried by the indoor power line 1, thereby preventing the frequency components of the power from flowing into the matching impedance element 21. It is thereby possible to prevent the matching impedance element 21 from generating heat.

The matching impedance element 21 is preferably an element having a function of preventing overheat resulting from an overcurrent or overpower. Examples of such an element include a fuse resistor and a flame-resistant resistor. Forming the matching impedance element 21 of an element having the above-mentioned function makes it possible to prevent the matching impedance element 21 from overheating even when the high-pass filter element 22 goes out of order and the matching impedance element 21 is supplied with an overcurrent or overpower.

Figure 4:
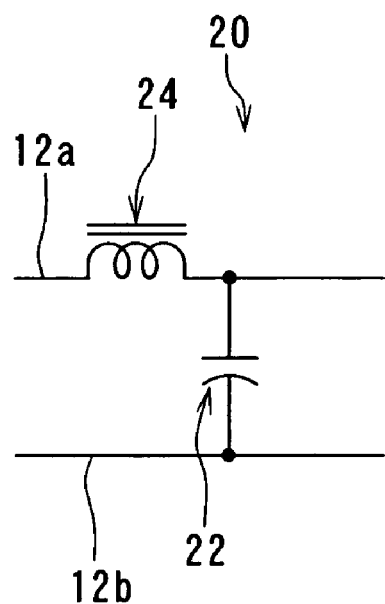
FIG. 4 is a circuit diagram showing another example of the configuration of the impedance matching circuit shown in FIG. 2.

FIG. 4 is a circuit diagram showing another example of the configuration of the impedance matching circuit 20. The impedance matching circuit 20 shown in FIG. 4 includes a matching impedance element 24 and the high-pass filter element 22. The matching impedance element 24 is provided on at least either one of the power supply lines, such as the power supply line 12a. The matching impedance element 24 sets the impedance of the indoor power line 1 to a predetermined value when the electrical equipment 80 is not connected to the power supply channel 12, and suppresses variations in the impedance of the indoor power line 1 resulting from connection of the electrical equipment 80 to the power supply channel 12. That is, the matching impedance element 24 combines the functions of the matching impedance element 21 and the variation-suppressing impedance element 23 shown in FIG. 3. Consequently, the impedance matching circuit 20 shown in FIG. 4 allows reduction in the number of parts as compared with the impedance matching circuit 20 shown in FIG. 3. The matching impedance element 24 is an inductor, for example.

In the impedance matching circuit 20 shown in FIG. 4, the high-pass filter element 22 is located between the two power supply lines 12a and 12b, at a position closer to the electrical equipment 80 than the matching impedance element 24 is. The high-pass filter element 22 interrupts frequency components of electric power carried by the indoor power line 1.

Figure 5:
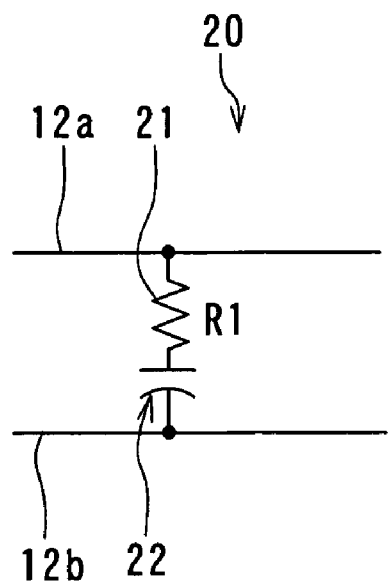
FIG. 5 is a circuit diagram showing still another example of the configuration of the impedance matching circuit shown in FIG. 2.

FIG. 5 is a circuit diagram showing still another example of the configuration of the impedance matching circuit 20. The impedance matching circuit 20 shown in FIG. 5 is configured by omitting the variation-suppressing impedance element 23 from the impedance matching circuit 20 shown in FIG. 3.

Figure 6:
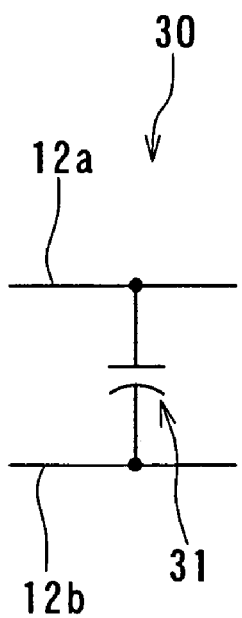
FIG. 6 is a circuit diagram showing an example of a configuration of the normal mode filter circuit shown in FIG. 2.

FIG. 6 is a circuit diagram showing an example of a configuration of the normal mode filter circuit 30. The normal mode filter circuit 30 shown in FIG. 6 includes a shunt circuit 31 provided between the two power supply lines 12a and 12b. The shunt circuit 31 reduces normal mode noise occurring from the electrical equipment 80 when the equipment 80 is connected to the power supply channel 12. The shunt circuit 31 contains a capacitor, for example.

Figure 7:
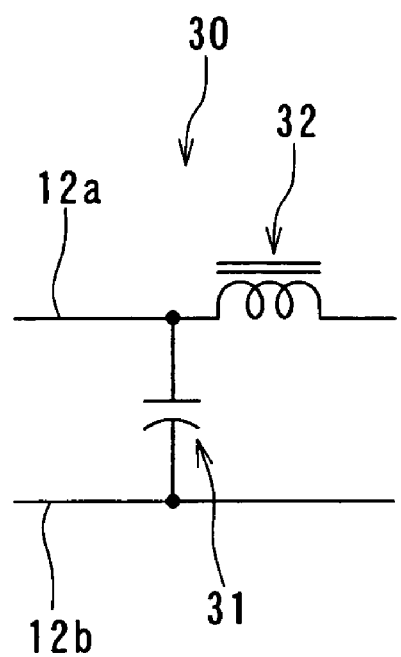
FIG. 7 is a circuit diagram showing another example of the configuration of the normal mode filter circuit shown in FIG. 2.

FIG. 7 is a circuit diagram showing another example of the configuration of the normal mode filter circuit 30. The normal mode filter circuit 30 shown in FIG. 7 includes the shunt circuit 31, like the circuit shown in FIG. 6. The normal mode filter circuit 30 shown in FIG. 7 further includes a noise-reducing inductor 32 that is provided on at least either one of the power supply lines, such as the power supply line 12a, at a position closer to the electrical equipment 80 than the shunt circuit 31 is. The noise-reducing inductor 32 reduces normal mode noise occurring from the electrical equipment 80 when the equipment 80 is connected to the power supply channel 12. Providing the noise-reducing inductor 32 is effective especially when the normal mode noise occurring from the electrical equipment 80 is high.

Figure 8:
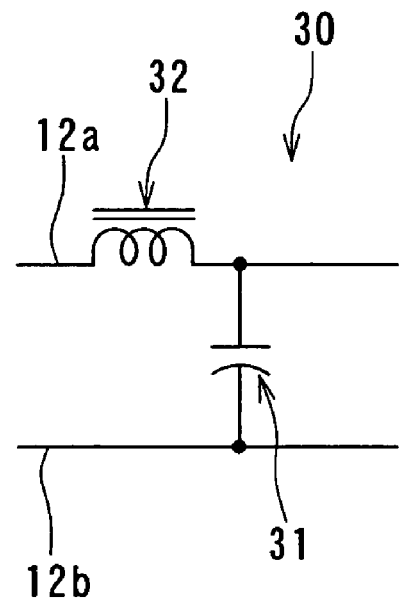
FIG. 8 is a circuit diagram showing still another example of the configuration of the normal mode filter circuit shown in FIG. 2.

FIG. 8 is a circuit diagram showing still another example of the configuration of the normal mode filter circuit 30. The normal mode filter circuit 30 shown in FIG. 8 includes the shunt circuit 31, like the circuit shown in FIG. 6. The normal mode filter circuit 30 shown in FIG. 8 further includes the noise-reducing inductor 32 that is provided on at least either one of the power supply lines, such as the power supply line 12a, at a position farther from the electrical equipment 80 than the shunt circuit 31 is. The noise-reducing inductor 32 reduces normal mode noise occurring from the electrical equipment 80 when the equipment 80 is connected to the power supply channel 12. Providing the noise-reducing inductor 32 is effective especially when the normal mode noise occurring from the electrical equipment 80 is high.

As the impedance matching circuit 20 and the normal mode filter circuit 30 of the embodiment, it is possible to use any of the three impedance matching circuits 20 shown in FIG. 3 to FIG. 5 and any of the three normal mode filter circuits 30 shown in FIG. 6 to FIG. 8 in combination.

In the embodiment, in the case of employing the impedance matching circuit 20 including the matching impedance element 21 as shown in FIG. 3 and FIG. 5, the following configuration is preferable. That is, in this case, it is preferable that an impedance-increasing element having the function mentioned below is provided between the matching impedance element 21 and the shunt circuit 31 of the normal mode filter circuit 30. The impedance-increasing element has the function of making the impedance of the power supply lines 12a and 12b higher than that of the matching impedance element 21 at frequencies within the communication band, as the electrical-equipment-80 side is viewed from the position where the matching impedance element 21 is located. Examples of the impedance-increasing element include the variation-suppressing impedance element 23 shown in FIG. 3 and the noise-reducing inductor 32 shown in FIG. 8. Such a configuration can be achieved by a combination of the impedance matching circuit 20 shown in FIG. 3 with any one of the normal mode filter circuits 30 shown in FIGS. 6 and 8, or a combination of the impedance matching circuit 20 shown in FIG. 5 with the normal mode filter circuit 30 shown in FIG. 8.

As described above, if the impedance-increasing element is provided between the matching impedance element 21 and the shunt circuit 31 of the normal mode filter circuit 30, it is possible to prevent a large drop in impedance of the indoor power line 1 even when the load 82 of the electrical equipment 80 has an impedance Z3 that is lower than the desired impedance Z of the indoor power line 1.

Figure 9:
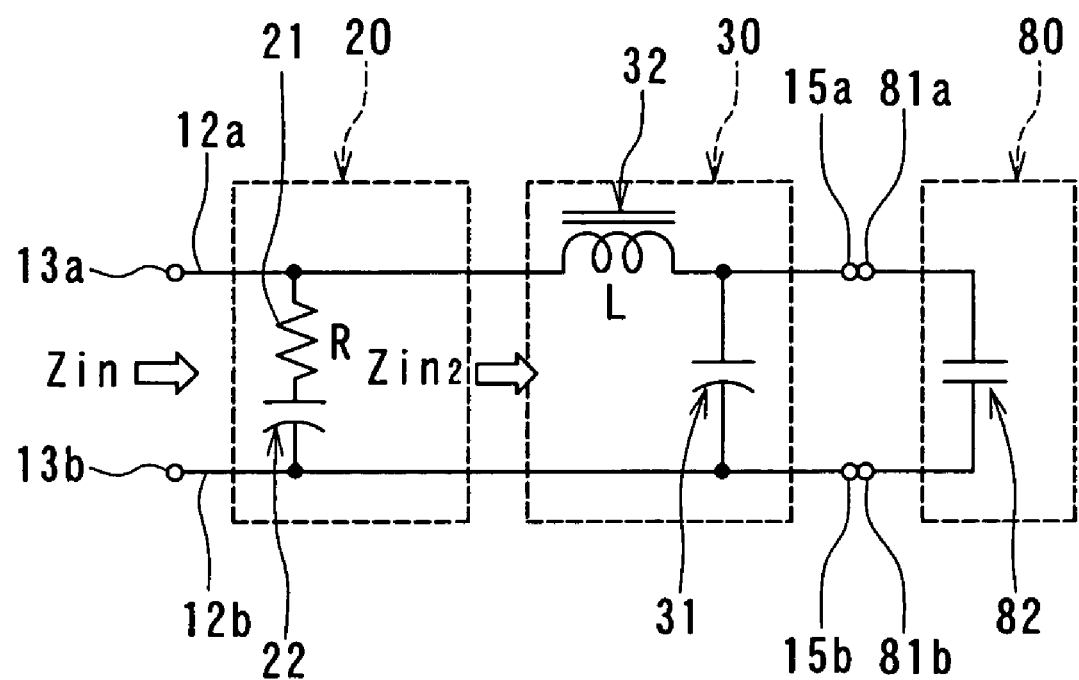
FIG. 9 is an explanatory diagram for explaining a preferable range of impedance of an impedance-increasing element provided in the impedance matching circuit or in the normal mode filter circuit shown in FIG. 2.

Reference is now made to FIG. 9 to describe a preferable range of impedance of the impedance-increasing element. FIG. 9 shows an example of the configuration of the impedance matching circuit 20, the normal mode filter circuit 30, and the electrical equipment 80. Here, it is supposed that the impedance matching circuit 20 has the configuration shown in FIG. 5, and the normal mode filter circuit 30 has the configuration shown in FIG. 8. In this case, the inductor 32 of the normal mode filter circuit 30 functions as the impedance-increasing element. The load 82 of the electrical equipment 80 is shown as a capacitor. At frequencies within the communication band, impedances of the high-pass filter element 22 of the impedance matching circuit 20, the shunt circuit 31 of the normal mode filter circuit 30, and the load 82 of the electrical equipment 80 shall be all negligible. The characteristic impedance of the indoor power line 1 and the impedance of the matching impedance element 21 shall be both 100 Ω.

In the configuration shown in FIG. 9, when the electrical equipment 80 is not connected to the equipment connection terminals 15a and 15b, the impedance of the indoor power line 1 is maintained at 100 Ω by the matching impedance element 21.

When the electrical equipment 80 is connected to the equipment connection terminals 15a and 15b, the impedance of the indoor power line 1 decreases because the load 82 of the electrical equipment 80 is low in impedance. Here, the maximum permissible decreasing rate of the impedance of the indoor power line 1 upon connection of the electrical equipment 80 shall be 20% of the characteristic impedance.

Where the impedance-matching-circuit-20 side is viewed from the connecting parts 13a and 13b, the impedance $Z_{in}$ across the power supply lines 12a and 12b at frequencies within the communication band is given by the following equation:

$$Z_{in} = (R\omega^2 L^2 + jR^2\omega L)/(R^2 + \omega^2 L^2),$$

where R is the impedance of the matching impedance element 21, L is the inductance of the inductor 32, $\omega$ is the angular frequency of the communication signal, and $j = \sqrt{(-1)}$.

Thus, the absolute value $|Z_{in}|$ of the impedance $Z_{in}$ is given by the following equation:

$$|Z_{in}| = \sqrt{(R^2\omega^4 L^4 + R^4\omega^2 L^2)/(R^2 + \omega^2 L^2)}$$
$$= R\omega L\sqrt{(\omega^2 L^2 + R^2)/(R^2 + \omega^2 L^2)}.$$

From the foregoing equation, the inductance L is represented by the following equation:

$$L = R|Z_{in}|/\omega\sqrt{(R^2 - |Z_{in}|^2)}$$
$$= R|Z_{in}|/2\pi f\sqrt{(R^2 - |Z_{in}|^2)},$$

where f is the frequency of the communication signal.

Assuming here that f=4 MHz, R=100 Ω, and $|Z_{in}|$=80 Ω, the inductance L is determined as follows:

$$L = (100 \times 80)/\{2\pi \times 4 \times 10^6 \times \sqrt{(100^2 - 80^2)}\}$$
$$= 5.3 \ \mu H.$$

Suppose that $Z_{in2}$ is the impedance of the power supply lines 12a and 12b at frequencies within the communication band when the electrical-equipment-80 side is viewed from the position where the matching impedance element 21 is located. The absolute value $|Z_{in2}|$ of the impedance $Z_{in2}$ is given by the following equation:

$$|Z_{in2}| = 2\pi fL = 2\pi \times 4 \times 10^6 \times 5.3 \times 10^{-6}$$
$$= 133 \ \Omega$$
$$\approx 1.3 \times R.$$

The higher the impedance of the impedance-increasing element (inductor 32), the closer $|Z_{in}|$ to the impedance R of the matching impedance element 21. From the foregoing, it is preferable that the impedance-increasing element has an impedance 1.3 times or more that of the matching impedance element 21.

In the circuit shown in FIG. 9, the impedance $Z_{in}$ actually varies with frequency with in the communication band due to resonance between the impedance-increasing element (inductor 32) and the load 82 (capacitor). To suppress the variation, it is preferable that the impedance-increasing element has an impedance ten times or more that of the matching impedance element 21.

The power line branching apparatus 10 according to the embodiment is formed by integrating all the components thereof. The power line branching apparatus 10 may be embedded in a wall, for example, to be used like a typical receptacle intended for power supply.

Now, description will be given of the functions of the power line branching apparatus 10. As shown in FIG. 2, the power line communication device 70 is connected to the communication lines 11a and 11b of the communication channel 11 through the device connection terminals 14a and 14b, respectively. The communication lines 11a and 11b are connected to the conductive lines 1a and 1b of the indoor power line 1, respectively. The power line communication device 70 sends out normal mode signals to the communication channel 11, and obtains normal mode signals from the communication channel 11. In this way, a plurality of power line communication devices 70 connected to the indoor power line 1 through the respective power line branching apparatuses 10 can communicate with each other by using the indoor power line 1 as the signal transmission channel.

The electrical equipment 80 that requires electric power is connected to the power supply lines 12a and 12b of the power supply channel 12 through the equipment connection terminals 15a and 15b, respectively. The power supply lines 12a and 12b are connected to the conductive lines 1a and 1b of the indoor power line 1, respectively. Thus, the electrical equipment 80 is connected to the conductive lines 1a and 1b of the indoor power line 1 through the power line branching apparatus 10, and is supplied with the electric power carried by the conductive lines 1a and 1b.

When the load 82 of the electrical equipment 80 has an impedance Z3 lower than the desired impedance Z of the indoor power line 1, the indoor power line 1 would vary (decrease) in impedance under the influence of the impedance Z3 of the load 82 if the electrical equipment 80 is connected to the indoor power line 1 without the power line branching apparatus 10 therebetween. Furthermore, when the electrical equipment 80 generates normal mode noise, the normal mode noise would flow into the indoor power line 1 if the electrical equipment 80 is connected to the indoor power line 1 without the power line branching apparatus 10 therebetween. Such impedance variations and noise production resulting from the electrical equipment 80 can cause a communication failure in the power line communication.

In contrast, in the present embodiment, the normal mode filter circuit 30 is provided between the electrical equipment 80 and the indoor power line 1. Consequently, according to the embodiment, normal mode noise occurring from the electrical equipment 80 is reduced by the normal mode filter circuit 30. It is thereby possible to prevent occurrences of normal mode noise in the indoor power line 1.

Furthermore, in the embodiment, the impedance matching circuit 20 is provided between the electrical equipment 80 and the indoor power line 1. The impedance matching circuit 20 has the function of setting the impedance of the indoor power line 1 to a predetermined value when the electrical equipment 80 is not connected to the power supply channel 12, and the function of suppressing variations in impedance of the indoor power line 1 resulting from connection of the electrical equipment 80 to the power supply channel 12. Therefore, according to the embodiment, it is possible to maintain the impedance of the indoor power line 1 at a predetermined value regardless of whether or not the electrical equipment 80 is connected to the power supply channel 12.

The normal mode filter circuit 30 of the embodiment includes the shunt circuit 31. The shunt circuit 31 can be prevented from affecting the impedance of the indoor power line 1 when an element for increasing the impedance of the power supply lines 12a and 12b at frequencies within the communication band is provided at a position farther from the electrical equipment 80 than the shunt circuit 31 is. Specifically, such an element may be the variation-suppressing impedance element 23 shown in FIG. 3, the matching impedance element 24 shown in FIG. 4, or the noise-reducing inductor 32 shown in FIG. 8.

As has been described, in the embodiment, the normal mode filter circuit 30 prevents the occurrence of normal mode noise in the indoor power line 1 while the impedance matching circuit 20 adjusts the impedance of the indoor power line 1 to a predetermined value Z. Therefore, the embodiment makes it possible to maintain the impedance of the indoor power line 1 at the predetermined value Z and to improve the state of the indoor power line 1 to make it suitable for power line communication. Specifically, by allowing the impedance of the load in the power line communication device 70 to match with the impedance Z of the indoor power line 1 maintained as above, it is possible to prevent signal reflection between the power line communication device 70 and the power line 1, and to thereby prevent signal deterioration.

Figure 10:
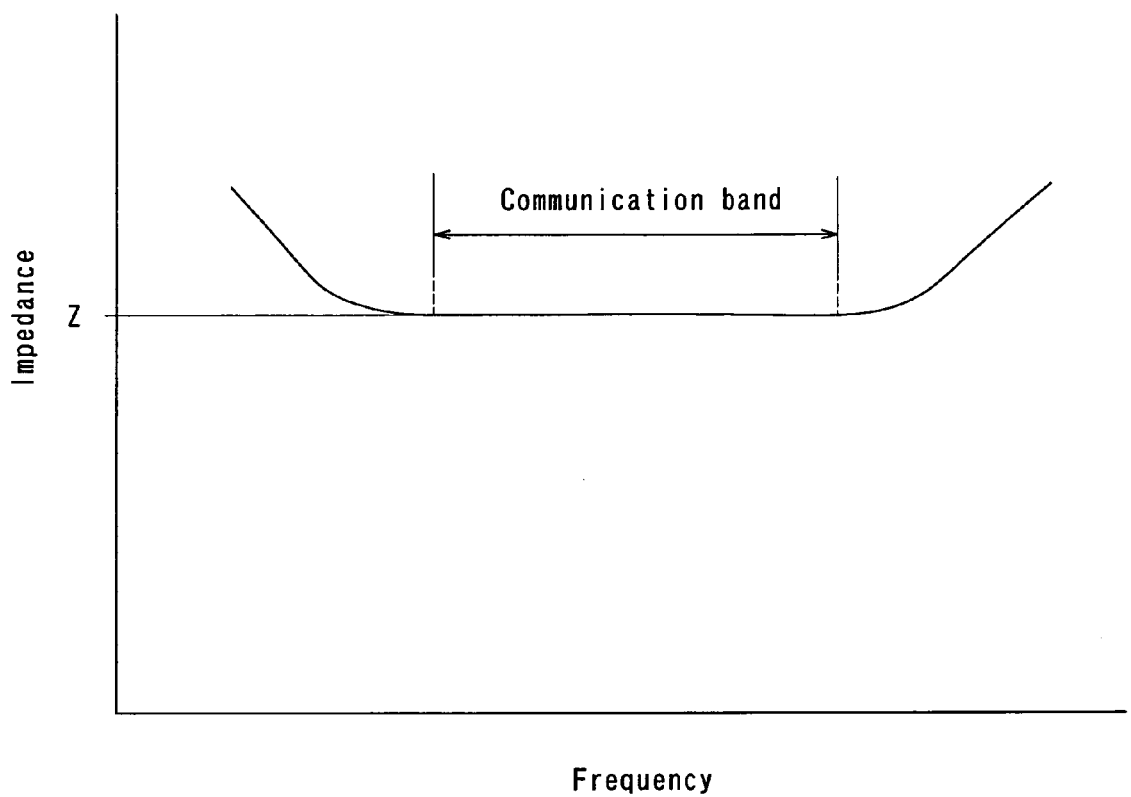
FIG. 10 is a plot showing a relationship between frequency and impedance of the indoor power line in the power line communication system according to the first embodiment.

FIG. 10 shows a relationship between frequency and impedance of the indoor power line 1 in the power line communication system according to the embodiment. The impedance of the high-pass filter element 22 is set at a sufficiently small value within the communication band. Consequently, as shown in FIG. 10, the impedance of the indoor power line 1 can be maintained at a predetermined value Z across the communication band.

Thus, according to the embodiment, when the connecting parts 13a and 13b are open, the frequency characteristic of the impedance between the connecting parts 13a and 13b is stabilized (flattened) across the communication band by a synergetic effect of the impedance matching circuit 20 and the normal mode filter circuit 30.

As described in the foregoing, according to the embodiment, it becomes possible to perform communication between a plurality of power line communication devices 70 by using the indoor power line 1. Besides, it is possible to avoid communication failures attributable to the electrical equipment 80 connected to the indoor power line 1, and improve the state of the indoor power line 1 to make it suitable for communication. This allows improvements in communication performance, including higher communication speed in the power line communication. Furthermore, the communication circuitry can be simplified, resulting in cost reduction for the power line communication system.

The power line branching apparatus 10 according to the embodiment comprises the device connection terminals 14a and 14b to which the power line communication device 70 is connected detachably, and the equipment connection terminals 15a and 15b to which the electrical equipment 80 is connected detachably. Thus, the embodiment allows the power line communication device 70 and the electrical equipment 80 to be connected detachably to the indoor power line 1.

The power line branching apparatus 10 according to the embodiment may be used like a typical receptacle intended for power supply, being embedded in walls, for example. Thus, the apparatus 10 does not affect the indoor appearance.

Figure 11:
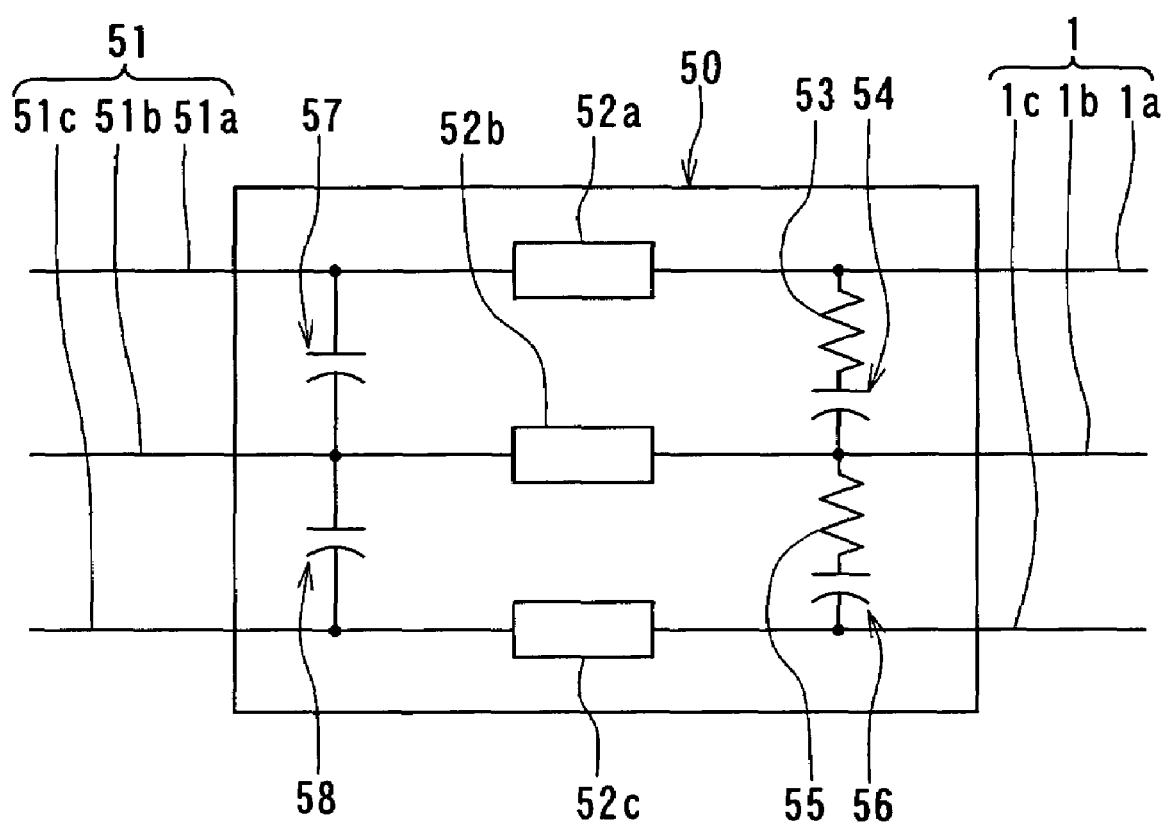
FIG. 11 is a circuit diagram showing an example of a configuration of a blocking filter of the first embodiment of the invention.
Figure 12:
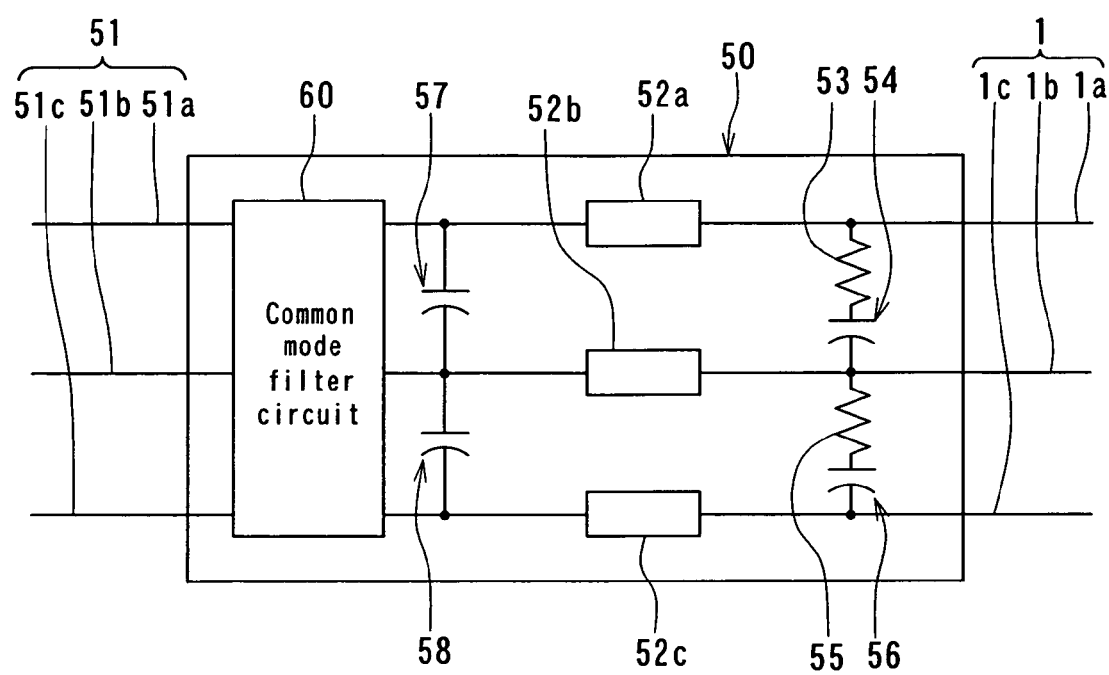
FIG. 12 is a circuit diagram showing another example of the configuration of the blocking filter of the first embodiment of the invention.
Figure 13:
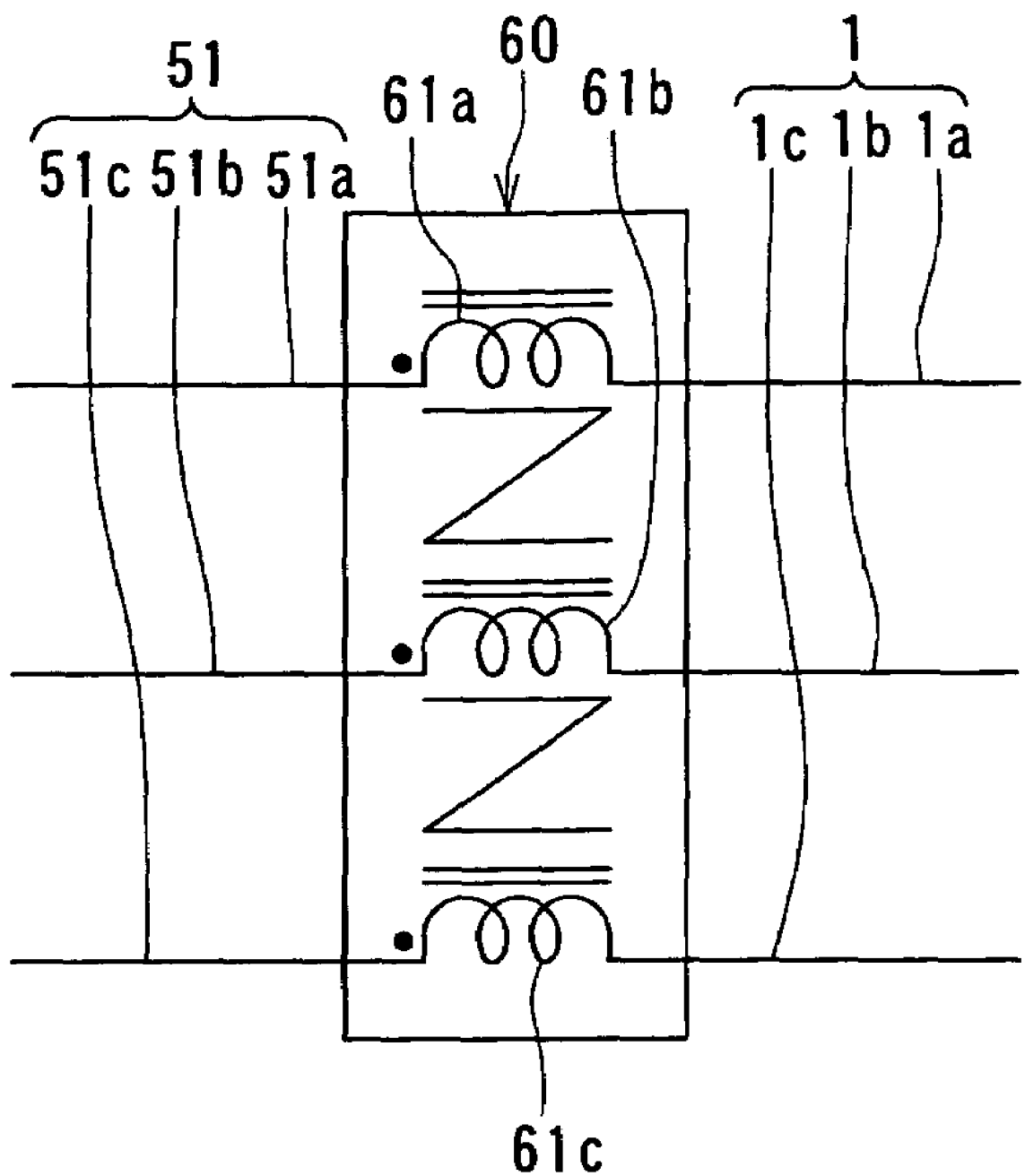
FIG. 13 is a circuit diagram showing an example of a configuration of the common mode filter circuit shown in FIG. 12.

Reference is now made to FIG. 11 to FIG. 13 to describe a configuration of the blocking filter 50 of the embodiment. FIG. 11 is a circuit diagram showing an example of the configuration of the blocking filter 50. In the example shown in FIG. 11, the blocking filter 50 includes three normal-mode-signal-reducing impedance elements 52a, 52b, and 52c which are arranged in series with the conductive lines 1a, 1b, and 1c of the indoor power line 1, respectively. Each of the impedance elements 52a, 52b, and 52c has an impedance higher than that of the indoor power line 1, so as to reduce normal mode communication signals on the conductive lines 1a, 1b, and 1c, respectively. The impedance elements 52a, 52b, and 52c are inductors, for example.

The blocking filter 50 further includes a circuit made up of an impedance element 53 and a high-pass filter element 54 connected in series to each other. This circuit is located between the conductive lines 1a and 1b of the indoor power line 1, at a position closer to the indoor power line 1 than the impedance elements 52a and 52b are. The blocking filter 50 further includes a circuit made up of an impedance element 55 and a high-pass filter element 56 connected in series to each other. This circuit is located between the conductive lines 1b and 1c of the indoor power line 1, at a position closer to the indoor power line 1 than the impedance elements 52b and 52c are. The impedance elements 53 and 55 are each intended to set the impedance of the indoor power line 1 to a predetermined value. The high-pass filter elements 54 and 56 each function to interrupt the frequency components of electric power carried by the indoor power line 1. The impedance elements 53 and 55 are resistors, for example. The high-pass filter elements 54 and 56 are capacitors, for example. The impedances of the high-pass filter elements 54 and 56 are set at a sufficiently small value within the communication band.

The blocking filter 50 further includes a shunt circuit 57 for reducing normal mode communication signals. The shunt circuit 57 is located between the conductive lines 1a and 1b of the indoor power line 1, at a position closer to the outdoor power line 51 than the impedance elements 52a and 52b are. The blocking filter 50 further includes a shunt circuit 58 for reducing normal mode communication signals. The shunt circuit 58 is located between the conductive lines 1b and 1c of the indoor power line 1, at a position closer to the outdoor power line 51 than the impedance elements 52b and 52c are. Each of the shunt circuits 57 and 58 includes a capacitor, for example.

According to the blocking filter 50 shown in FIG. 11, the normal-mode-signal-reducing impedance elements 52a, 52b and 52c prevent normal mode communication signals on the indoor power line 1 from flowing out to the outdoor power line 51. In addition, according to this blocking filter 50, it is possible to adjust the impedance of the indoor power line 1 to a predetermined value by using the series circuit made up of the impedance element 53 and the high-pas filter element 54 and the series circuit made up of the impedance element 55 and the high-pass filter element 56. Furthermore, according to the blocking filter 50, the shunt circuits 57 and 58 prevent normal mode communication signals on the indoor power line 1 from flowing out to the outdoor power line 51.

FIG. 12 is a circuit diagram showing another example of the configuration of the blocking filter 50. The blocking filter 50 shown in FIG. 12 includes, besides the components shown in FIG. 11, a common mode filter circuit 60 for reducing common mode noise. The filter circuit 60 is located closer to the outdoor power line 51 than the shunt circuits 57 and 58 are.

FIG. 13 is a circuit diagram showing an example of a configuration of the common mode filter circuit 60. The common mode filter circuit 60 includes a core and windings 61a, 61b and 61c wound around the core. The windings 61a, 61b, and 61c are connected in series to the conductive lines 1a, 1b, and 1c, respectively. For example, when the core has a toroidal shape, the windings 61a, 61b, and 61c are arranged along the core at positions 120° shifted from one another. When the core is an EE core, an EI core, or a PQ core, for example, the windings 61a, 61b, and 61c are wound around the respective bobbins. With respect to the core, these bobbins are arranged at different positions in axial directions or radial directions of the bobbins. The windings 61a, 61b, and 61c may be insulated from one another by an insulating tape or the like, instead of using the bobbins.

According to the blocking filter 50 shown in FIG. 12, the common mode filter circuit 60 prevents common mode noise from flowing out from the indoor power line 1 to the outdoor power line 51, the common mode noise occurring after normal mode communication signals are reduced by the normal-mode-signal-reducing impedance elements 52a, 52b, 52c and the shunt circuits 57 and 58, for example. It is also possible to prevent other common mode noise from flowing in from the outdoor power line 51 to the indoor power line 1. The remainder of the functions and effects of the blocking filter 50 shown in FIG. 12 are the same as those of the blocking filter 50 shown in FIG. 11.

[Second Embodiment]

Figure 14:
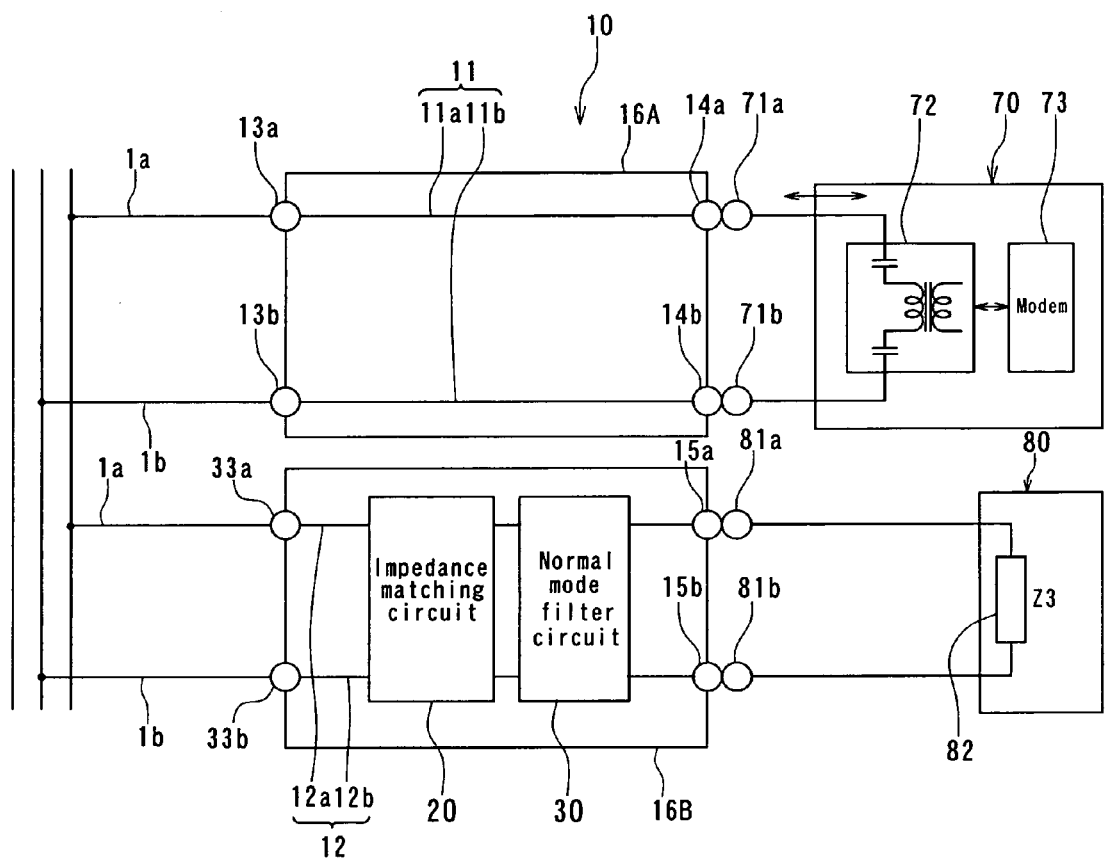
FIG. 14 is a circuit diagram showing a configuration of a power line branching apparatus according to a second embodiment of the invention.

Now, description will be given of a power line communication system and a power line branching apparatus according to a second embodiment of the invention. FIG. 14 is a circuit diagram showing a configuration of the power line branching apparatus 10 according to the second embodiment. The power line branching apparatus 10 according to the embodiment has a first accommodating member 16A and a second accommodating member 16B, instead of the accommodating member 16 of the first embodiment.

The first accommodating member 16A accommodates the connecting parts 13a and 13b that are respectively connected to the conductive lines 1a and 1b of the indoor power line 1, and the device connection terminals 14a and 14b to which the power line communication device 70 is connected detachably. The first accommodating member 16A further accommodates the communication channel 11 including the communication lines 11a and 11b for connecting the connecting part 13a and the device connection terminal 14a to each other, and connecting the connecting part 13b and the device connection terminal 14b to each other, respectively.

The second accommodating member 16B accommodates the connecting parts 33a and 33b that are respectively connected to the conductive lines 1a and 1b of the indoor power line 1, and the equipment connection terminals 15a and 15b to which the electrical equipment 80 is connected detachably. The second accommodating member 16B further accommodates the power supply channel 12 including the power supply lines 12a and 12b for connecting the connecting part 33a and the equipment connection terminal 15a to each other, and connecting the connecting part 33b and the equipment connection terminal 15b to each other, respectively. The second accommodating member 16B further accommodates the impedance matching circuit 20 and the normal mode filter circuit 30 located at a point along the power supply channel 12. The normal mode filter circuit 30 is located closer to the electrical equipment 80 than the impedance matching circuit 20 is.

Each of the accommodating members 16A and 16B may be a case or a plate-like member, like the accommodating member 16 of the first embodiment.

The circuit configuration of the power line branching apparatus 10 of the present embodiment is substantially the same as that of the power line branching apparatus 10 of the first embodiment.

The remainder of the configuration, functions and effects of the second embodiment are the same as those of the first embodiment.

[Third Embodiment]

Figure 15:
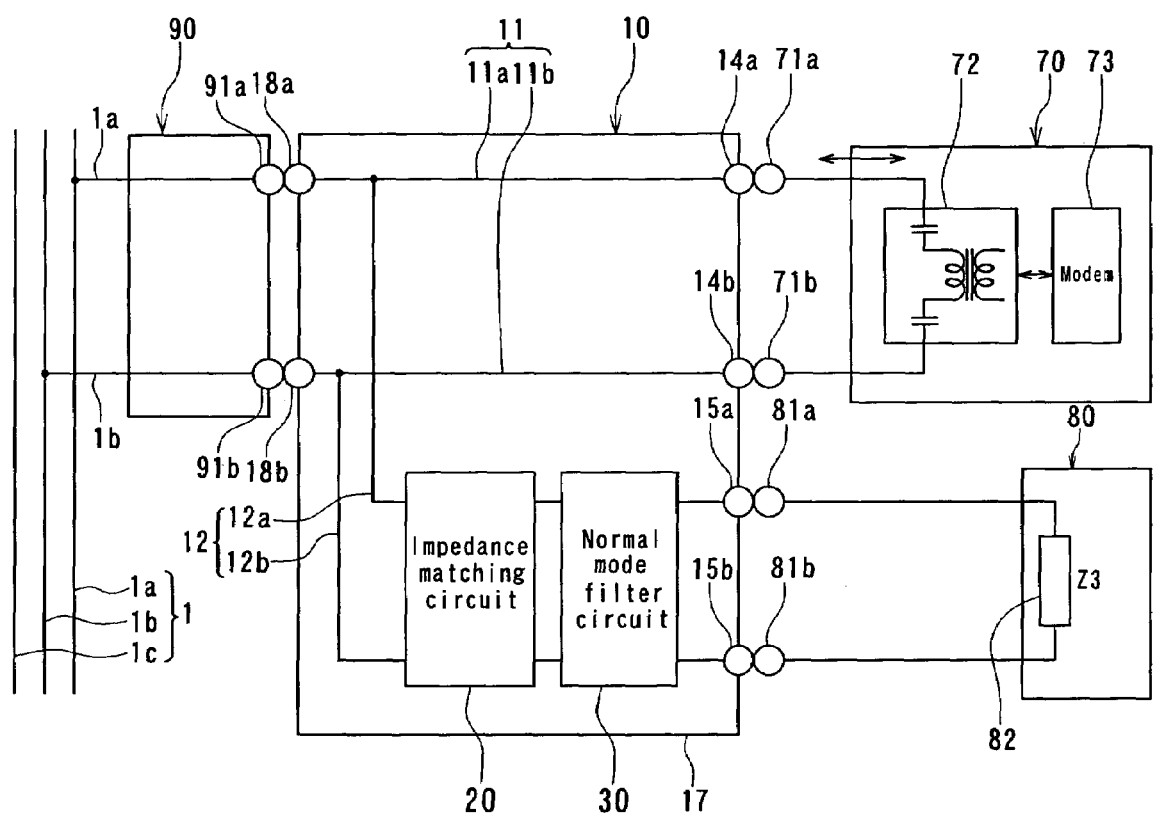
FIG. 15 is a circuit diagram showing a configuration of a power line branching apparatus according to a third embodiment of the invention.

Now, description will be given of a power line communication system and a power line branching apparatus according to a third embodiment of the invention. FIG. 15 is a circuit diagram showing a configuration of the power line branching apparatus 10 according to the third embodiment. The power line branching apparatus 10 according to the embodiment is detachably attachable to a typical receptacle 90 intended for power supply. The receptacle 90 has connection terminals 91a and 91b connected to the conductive lines 1a and 1b of the power line 1, respectively.

The power line branching apparatus 10 according to the embodiment has an accommodating member 17 formed as a case, instead of the accommodating member 16 of the first embodiment. In the accommodating member 17, there are provided plug-shaped connection terminals 18a and 18b, instead of the connecting parts 13a and 13b of the first embodiment. The connection terminals 18a and 18b are connected detachably to the connection terminals 91a and 91b of the receptacle 90, respectively. The connection terminals 18a and 18b correspond to the power line connecting part of the invention.

The circuit configuration of the power line branching apparatus 10 of the present embodiment is substantially the same as that of the power line branching apparatus 10 of the first embodiment.

According to the present embodiment, since the power line branching apparatus 10 is detachably attachable to the typical receptacle 90 intended for power supply, it is possible to configure a power line communication system easily as required, without affecting the indoor appearance.

The remainder of the configuration, functions and effects of the third embodiment are the same as those of the first embodiment.

[Fourth Embodiment]

Figure 16:
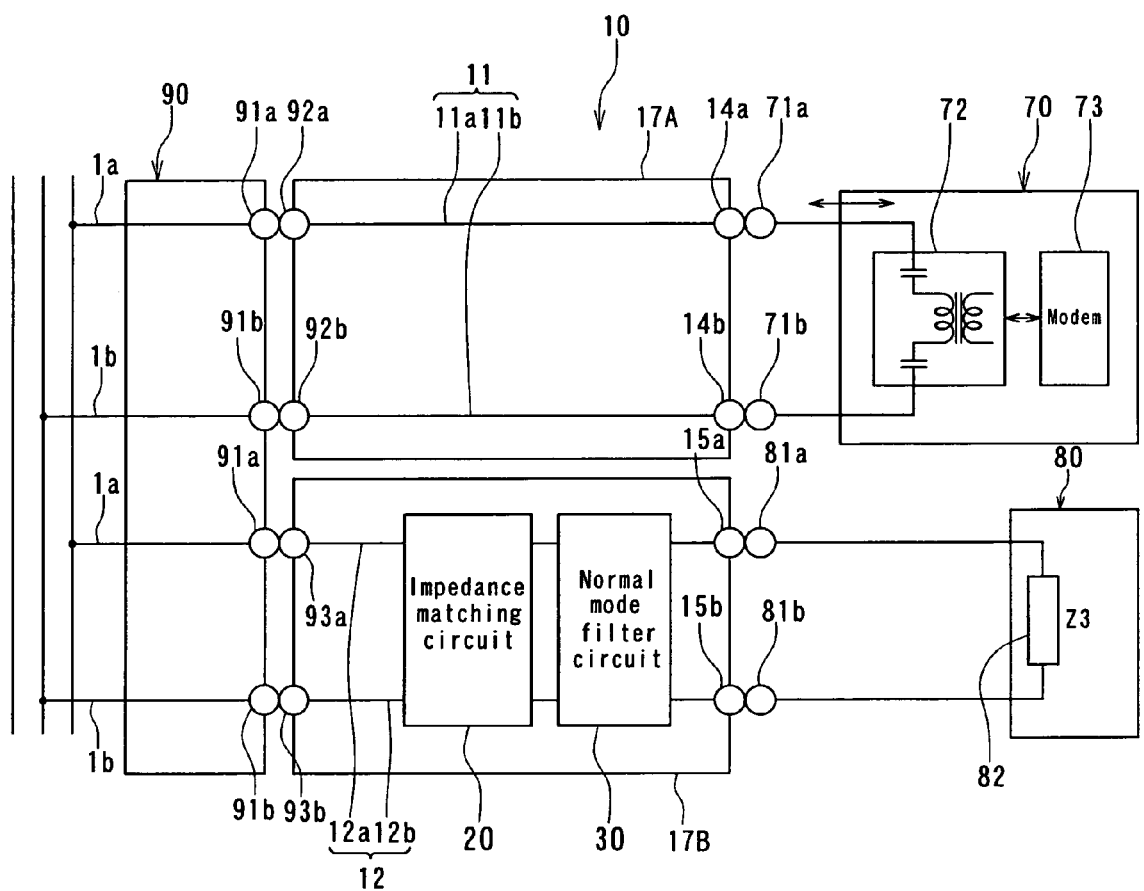
FIG. 16 is a circuit diagram showing a configuration of a power line branching apparatus according to a fourth embodiment of the invention.

Now, description will be given of a power line communication system and a power line branching apparatus according to a fourth embodiment of the invention. FIG. 16 is a circuit diagram showing a configuration of the power line branching apparatus 10 according to the fourth embodiment. The power line branching apparatus 10 according to the embodiment is detachably attachable to a typical receptacle 90 intended for power supply, like the third embodiment. The receptacle 90 has a plurality of pairs of connection terminals 91a and 91b connected to the conductive lines 1a and 1b of the power line 1, respectively.

The power line branching apparatus 10 according to the embodiment has a first accommodating member 17A and a second accommodating member 17B each formed as a case, instead of the accommodating member 16 of the first embodiment. In the present embodiment, instead of the connecting parts 13a and 13b of the first embodiment, there are provided plug-shaped connection terminals 92a and 92b that are provided in the first accommodating member 17A and connected detachably to the connection terminals 91a and 91b of the receptacle 90, respectively, and plug-shaped connection terminals 93a and 93b that are provided in the second accommodating member 17B and connected detachably to the connection terminals 91a and 91b of the receptacle 90, respectively. The connection terminals 92a and 92b, and the connection terminals 93a and 93b are connected to different pairs of connection terminals 91a and 91b. The connection terminals 92a and 92b correspond to the first power line connecting part of the invention. The connection terminals 93a and 93b correspond to the second power line connecting part of the invention.

Besides the connection terminals 92a and 92b, the first accommodating member 17A also accommodates the device connection terminals 14a and 14b to which the power line communication device 70 is connected detachably, and the communication channel 11 including the communication lines 11a and 11b for connecting the connection terminal 92a and the device connection terminal 14a to each other, and connecting the connection terminal 92b and the device connection terminal 14b to each other, respectively.

Besides the connection terminals 93a and 93b, The second accommodating member 17B also accommodates the equipment connection terminals 15a and 15b to which the electrical equipment 80 is connected detachably, and the power supply channel 12 including the power supply lines 12a and 12b for connecting the connection terminal 93a and the equipment connection terminal 15a to each other, and connecting the connection terminal 93b and the equipment connection terminal 15b to each other, respectively. The second accommodating member 17B further accommodates the impedance matching circuit 20 and the normal mode filter circuit 30 located at a point along the power supply channel 12. The normal mode filter circuit 30 is located closer to the electrical equipment 80 than the impedance matching circuit 20 is.

The circuit configuration of the power line branching apparatus 10 of the present embodiment is substantially the same as that of the power line branching apparatus 10 of the first embodiment.

According to the present embodiment, since the power line branching apparatus 10 is detachably attachable to the typical receptacle 90 intended for power supply, it is possible to configure a power line communication system easily as required, without affecting the indoor appearance.

The remainder of the configuration, functions and effects of the fourth embodiment are the same as those of the first embodiment.

[Fifth Embodiment]

Figure 17:
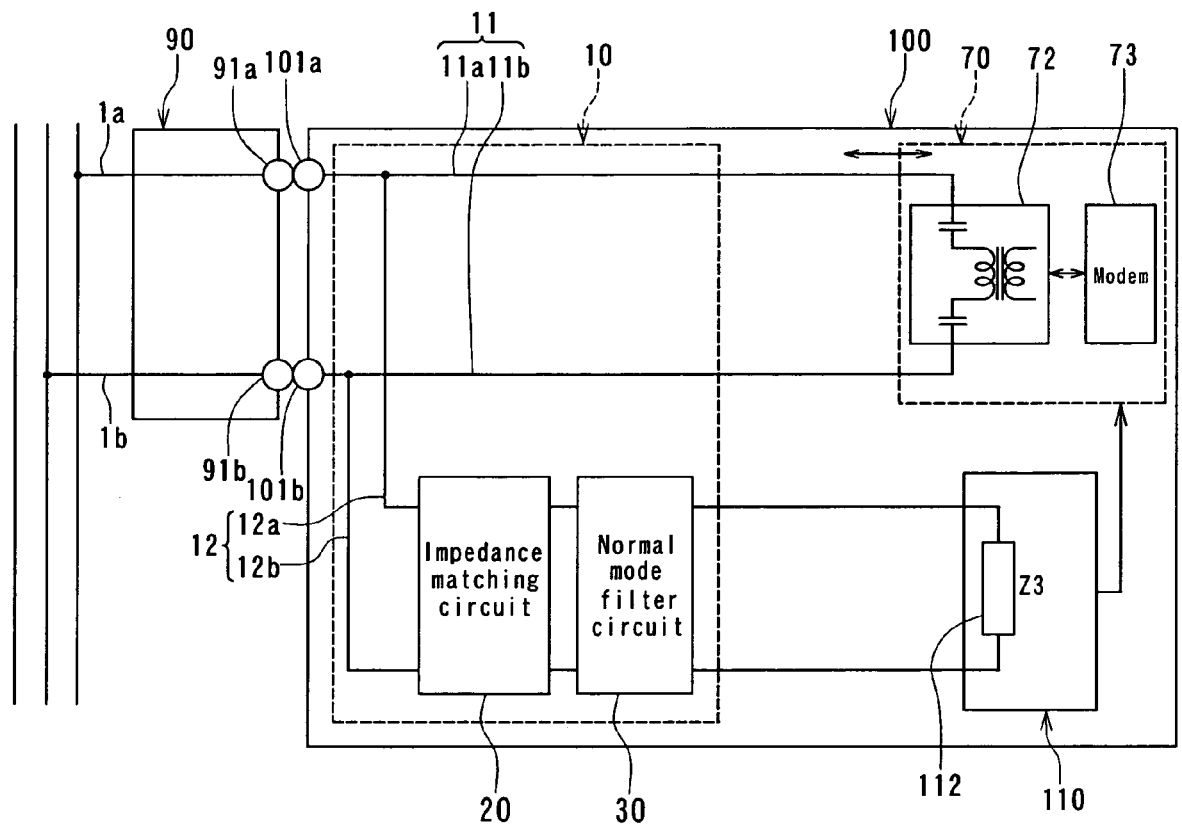
FIG. 17 is a circuit diagram showing a configuration of a power line branching apparatus according to a fifth embodiment of the invention.

Now, description will be given of a power line communication system and a power line branching apparatus according to a fifth embodiment of the invention. FIG. 17 is a circuit diagram showing a configuration of electrical equipment including the power line branching apparatus 10 according to the fifth embodiment. The power line branching apparatus 10 according to the embodiment is incorporated in electrical equipment 100 that includes a power line communication device and requires electric power. The electrical equipment 100 is detachably attachable to a typical receptacle 90 intended for power supply. The receptacle 90 has the connection terminals 91a and 91b connected to the conductive lines 1a and 1b of the power line 1, respectively.

The electrical equipment 100 has plug-shaped power line connection terminals 101a and 101b that are detachably connected to the connection terminals 91a and 91b of the receptacle 90. The power line connection terminals 101a and 101b correspond to the power line connecting part of the invention. The electrical equipment 100 incorporates the power line communication device 70, a power supply section 110, and the power line branching apparatus 10 according to the embodiment. The power supply section 110 is supplied with electric power carried by the indoor power line 1, and supplies the electric power to individual components in the electrical equipment 100, such as the power line communication device 70. The power line communication device 70 is configured the same as in the first embodiment.

The power line branching apparatus 10 according to the present embodiment has almost the same configuration as that of the power line branching apparatus 10 according to the first embodiment. In the present embodiment, however, one end of each of the communication lines 11a and 11b is connected to the power line connection terminals 101a and 101b, respectively, and the other end of each of the communication lines 11a and 11b is connected to the power line communication device 70. On the other hand, one end of each of the power supply lines 12a and 12b is connected to the power line connection terminals 101a and 101b, respectively, and the other end of each of the power supply lines 12a and 12b is connected to a load 112 of the power supply section 110. The load 112 shall have an impedance Z3, like the load 82 of the electrical equipment 80 of the first embodiment.

In the embodiment, the power line branching apparatus 10 is incorporated in the electrical equipment 100. This makes it possible to perform power line communication easily through the use of the electrical equipment 100. All that is needed is to attach the single pair of power line connection terminals 101a and 101b to the single receptacle 90 like ordinary electrical equipment not incorporating the power line branching apparatus 10. The embodiment also makes it possible to avoid communication failures attributable to the power supply section 110 of the electrical equipment 100, and to improve the state of the indoor power line 1 to make it suitable for communication. Furthermore, according to the embodiment, the power line branching apparatus 10 does not affect the indoor appearance because it is incorporated in the electrical equipment 100.

The remainder of the configuration, functions and effects of the fifth embodiment are the same as those of the first embodiment.

The invention is not limited to the foregoing embodiments but may be practiced instill other ways. For example, the impedance matching circuit 20, the normal mode filter circuit 30, and the blocking filter circuit 50 may be configured otherwise than as described in the foregoing embodiments.

As has been described, in the power line communication system of the invention, there are provided the communication channel and the power supply channel. The impedance matching circuit provided on the power supply channel adjusts the impedance of the indoor power line to a predetermined value. The filter circuit provided on the power supply channel reduces noise occurring from electrical equipment when the equipment is connected to the power supply channel. Consequently, according to the invention, it becomes possible to perform communication between a plurality of power line communication devices by using an indoor power line. Besides, it is possible to avoid communication failures attributable to the electrical equipment connected to the indoor power line, and the state of the indoor power line can be improved to become suitable for communication.

In the power line communication system of the invention, the filter circuit may be located closer to the electrical equipment than the impedance matching circuit is. In this case, it is possible to prevent the filter circuit from affecting the impedance of the indoor power line.

In the power line communication system of the invention, the power supply channel may include two power supply lines, and the impedance matching circuit may include: a matching impedance element provided between the two power supply lines, for setting the impedance of the indoor power line to a predetermined value when the electrical equipment is not connected to the power supply channel; a high-pass filter element provided between the two power supply lines, being connected in series to the matching impedance element, for interrupting a frequency component of electric power carried by the indoor power line; and a variation-suppressing impedance element provided on at least either one of the power supply lines at a position closer to the electrical equipment than the matching impedance element and the high-pass filter element are, for suppressing variations in the impedance of the indoor power line resulting from connection of the electrical equipment to the power supply channel. In this case, it is possible to maintain the impedance of the indoor power line at a predetermined value regardless of whether or not the electrical equipment is connected to the power supply channel.

In the power line communication system of the invention, the power supply channel may include two power supply lines, and the impedance matching circuit may include: a matching impedance element provided on at least either one of the power supply lines, for setting the impedance of the indoor power line to a predetermined value when the electrical equipment is not connected to the power supply channel, and suppressing variations in the impedance of the indoor power line resulting from connection of the electrical equipment to the power supply channel; and a high-pass filter element provided between the two power supply lines at a position closer to the electrical equipment than the matching impedance element is, for interrupting a frequency component of electric power carried by the indoor power line. In this case, it is possible to maintain the impedance of the indoor power line at a predetermined value regardless of whether or not the electrical equipment is connected to the power supply channel.

In the power line communication system of the invention, the power supply channel may include two power supply lines, and the filter circuit may include a shunt circuit provided between the two power supply lines, for reducing normal mode noise occurring from the electrical equipment when the equipment is connected to the power supply channel. In this case, normal mode noise occurring from the electrical equipment connected to the power supply channel, in particular, can be reduced by the filter circuit.

The power line communication system of the invention may comprise a blocking filter that includes a plurality of normal-mode-signal-reducing impedance elements for reducing normal mode signals. In this case, it is possible to prevent normal mode signals on the indoor power line from flowing out to the outdoor power line.

In the power line communication system of the invention, the blocking filter may further include a circuit that is provided between a plurality of conductive lines of the indoor power line, the circuit being made up of an impedance element and a high-pass filter element connected in series to each other, the impedance element setting the impedance of the indoor power line to a predetermined value, and the high-pass filter element interrupting a frequency component of electric power carried by the indoor power line. In this case, the impedance of the indoor power line can be adjusted to a predetermined value by the blocking filter, too.

In the power line communication system of the invention, the blocking filter may further include a shunt circuit for reducing normal mode signals, the shunt circuit being provided between the plurality of conductive lines at a position closer to the outdoor power line than the normal-mode-signal-reducing impedance elements are. In this case, normal mode signals on the indoor power line can be prevented from flowing out to the outdoor power line by the shunt circuit, too.

In the power line communication system of the invention, the blocking filter may further include a common mode filter circuit for reducing common mode noise. In this case, it is possible to prevent common mode noise from flowing out from the indoor power line to the outdoor power line, and to prevent common mode noise from flowing into the indoor power line from the outdoor power line.

The power line communication system of the invention may further comprise: a device connecting part to which the communication device is connected detachably, the device connecting part being provided at an end of the communication channel closer to the communication device; and an equipment connecting part to which the electrical equipment is connected detachably, the equipment connecting part being provided at an end of the power supply channel closer to the electrical equipment. In this case, it becomes possible to connect the communication device and the electrical equipment to the indoor power line detachably.

The power line communication system of the invention may further comprise a power line connecting part for connecting the communication channel and the power supply channel to the indoor power line detachably, and in this case, the communication channel, the power supply channel, the impedance matching circuit, and the filter circuit may be incorporated in electrical equipment that includes the communication device and requires electric power. In this case, it is possible to connect the electrical equipment, which includes the communication device and requires electric power, to the indoor power line detachably through the single power line connecting part.

In the power line branching apparatus of the invention, there are provided the communication channel and the power supply channel. The impedance matching circuit provided on the power supply channel adjusts the impedance of the indoor power line to a predetermined value. The filter circuit provided on the power supply channel reduces noise occurring from electrical equipment when the equipment is connected to the power supply channel. Consequently, according to the invention, it becomes possible to perform communication between a plurality of power line communication devices by using an indoor power line. Besides, it is possible to avoid communication failures attributable to the electrical equipment connected to the indoor power line, and the state of the indoor power line can be improved to become suitable for communication.

In the power line branching apparatus of the invention, the filter circuit may be located closer to the electrical equipment than the impedance matching circuit is. In this case, it is possible to prevent the filter circuit from affecting the impedance of the indoor power line.

In the power line branching apparatus of the invention, the power supply channel may include two power supply lines, and the impedance matching circuit may include: a matching impedance element provided between the two power supply lines, for setting the impedance of the indoor power line to a predetermined value when the electrical equipment is not connected to the power supply channel; a high-pass filter element provided between the two power supply lines, being connected in series to the matching impedance element, for interrupting a frequency component of electric power carried by the indoor power line; and a variation-suppressing impedance element provided on at least either one of the power supply lines at a position closer to the electrical equipment than the matching impedance element and the high-pass filter element are, for suppressing variations in the impedance of the indoor power line resulting from connection of the electrical equipment to the power supply channel. In this case, it is possible to maintain the impedance of the indoor power line at a predetermined value regardless of whether or not the electrical equipment is connected to the power supply channel.

In the power line branching apparatus of the invention, the power supply channel may include two power supply lines, and the impedance matching circuit may include: a matching impedance element provided on at least either one of the power supply lines, for setting the impedance of the indoor power line to a predetermined value when the electrical equipment is not connected to the power supply channel, and suppressing variations in the impedance of the indoor power line resulting from connection of the electrical equipment to the power supply channel; and a high-pass filter element provided between the two power supply lines at a position closer to the electrical equipment than the matching impedance element is, for interrupting a frequency component of electric power carried by the indoor power line. In this case, it is possible to maintain the impedance of the indoor power line at a predetermined value regardless of whether or not the electrical equipment is connected to the power supply channel.

In the power line branching apparatus of the invention, the power supply channel may include two power supply lines, and the filter circuit may include a shunt circuit provided between the two power supply lines, for reducing normal mode noise occurring from the electrical equipment when the equipment is connected to the power supply channel. In this case, normal mode noise occurring from the electrical equipment connected to the power supply channel, in particular, can be reduced by the filter circuit.

The power line branching apparatus of the invention may further comprise: a device connecting part to which the communication device is connected detachably, the device connecting part being provided at an end of the communication channel closer to the communication device; and an equipment connecting part to which the electrical equipment is connected detachably, the equipment connecting part being provided at an end of the power supply channel closer to the electrical equipment. In this case, it becomes possible to connect the communication device and the electrical equipment to the indoor power line detachably.

The power line branching apparatus of the invention may further comprise a power line connecting part for connecting the communication channel and the power supply channel to the indoor power line detachably, and in this case, the communication channel, the power supply channel, the impedance matching circuit, and the filter circuit may be incorporated in electrical equipment that includes the communication device and requires electric power. In this case, it is possible to connect the electrical equipment, which includes the communication device and requires electric power, to the indoor power line detachably through the single power line connecting part.

It is apparent that the present invention may be carried out in various modes and may be modified in various manners based on the foregoing description. Therefore, within the scope of equivalence of the scope of the following claims, the invention may be practiced otherwise than as specifically described.

What is claimed is:

1. A power line communication system for allowing communication between a plurality of communication devices by using an indoor power line, comprising:
   an indoor power line;
   a communication channel that is branched off from the indoor power line and connectable to a communication device for performing communication by using the indoor power line;
   a power supply channel that is branched off from the indoor power line and connectable to electrical equipment that requires electric power;
   an impedance matching circuit provided on the power supply channel, for setting an impedance of the indoor power line to a predetermined value; and
   a filter circuit provided on the power supply channel, for reducing noise occurring from the electrical equipment when the equipment is connected to the power supply channel,
   wherein the power supply channel includes two power supply lines, and the impedance matching circuit includes:
   a matching impedance element provided between the two power supply lines, for setting the impedance of the indoor power line to a predetermined value when the electrical equipment is not connected to the power supply channel;
   a high-pass filter element provided between the two power supply lines, being connected in series to the matching impedance element, for interrupting a frequency component of electric power carried by the indoor power line; and
   a variation-suppressing impedance element provided on at least either one of the power supply lines at a position closer to the electrical equipment than the matching impedance element and the high-pass filter element are, for suppressing variations in the impedance of the indoor power line resulting from connection of the electrical equipment to the power supply channel.

2. A power line communication system according to claim 1, wherein the matching impedance element is a resistor.

3. A power line communication system according to claim 1, wherein the matching impedance element has a function of preventing overheat resulting from an overcurrent or overpower.

4. A power line communication system for allowing communication between a plurality of communication devices by using an indoor power line, comprising:
   an indoor power line;
   a communication channel that is branched off from the indoor power line and connectable to a communication device for performing communication by using the indoor power line;
   a power supply channel that is branched off from the indoor power line and connectable to electrical equipment that requires electric power;
   an impedance matching circuit provided on the power supply channel, for setting an impedance of the indoor power line to a predetermined value; and
   a filter circuit provided on the power supply channel, for reducing noise occurring from the electrical equipment when the equipment is connected to the power supply channel,
   wherein the power supply channel includes two power supply lines, and the impedance matching circuit includes:
   a matching impedance element provided on at least either one of the power supply lines, for setting the impedance of the indoor power line to a predetermined value when the electrical equipment is not connected to the power supply channel, and suppressing variations in the impedance of the indoor power line resulting from connection of the electrical equipment to the power supply channel; and
   a high-pass filter element provided between the two power supply lines at a position closer to the electrical equipment than the matching impedance element is, for interrupting a frequency component of electric power carried by the indoor power line.

5. A power line communication system according to claim 4, wherein the matching impedance element is an inductor.

6. A power line communication system for allowing communication between a plurality of communication devices by using an indoor power line, comprising:
   an indoor power line;
   a communication channel that is branched off from the indoor power line and connectable to a communication device for performing communication by using the indoor power line;
   a power supply channel that is branched off from the indoor power line and connectable to electrical equipment that requires electric power;
   an impedance matching circuit provided on the power supply channel, for setting an impedance of the indoor power line to a predetermined value; and
   a filter circuit provided on the power supply channel, for reducing noise occurring from the electrical equipment when the equipment is connected to the power supply channel,
   wherein the power supply channel includes two power supply lines, and the filter circuit includes a shunt circuit provided between the two power supply lines, for reducing normal mode noise occurring from the electrical equipment when the equipment is connected to the power supply channel.

7. A power line communication system according to claim 6, wherein the filter circuit further includes a noise-reducing inductor provided on at least either one of the power supply lines, for reducing normal mode noise occurring from the electrical equipment when the equipment is connected to the power supply channel.

8. A power line communication system for allowing communication between a plurality of communication devices by using an indoor power line, comprising:
   an indoor power line;
   a communication channel that is branched off from the indoor power line and connectable to a communication device for performing communication by using the indoor power line;
   a power supply channel that is branched off from the indoor power line and connectable to electrical equipment that requires electric power;

an impedance matching circuit provided on the power supply channel, for setting an impedance of the indoor power line to a predetermined value; and a filter circuit provided on the power supply channel, for reducing noise occurring from the electrical equipment when the equipment is connected to the power supply channel, wherein the indoor power line includes a plurality of conductive lines and is connected to an outdoor power line, the power line communication system further comprising a blocking filter provided between the outdoor power line and the indoor power line, the blocking filter including a plurality of normal-mode-signal-reducing impedance elements for reducing normal mode signals, the normal-mode-signal-reducing impedance elements being connected in series to the respective conductive lines of the indoor power line and having an impedance higher than that of the indoor power line.

9. A power line communication system according to claim 8, wherein the blocking filter further includes a circuit that is provided between the plurality of conductive lines of the indoor power line, the circuit being made up of an impedance element and a high-pass filter element connected in series to each other, the impedance element setting the impedance of the indoor power line to a predetermined value, and the high-pass filter element interrupting a frequency component of electric power carried by the indoor power line.

10. A power line communication system according to claim 8, wherein the blocking filter further includes a shunt circuit for reducing normal mode signals, the shunt circuit being provided between the plurality of conductive lines at a position closer to the outdoor power line than the normal-mode-signal-reducing impedance elements are.

11. A power line communication system according to claim 8, wherein the blocking filter further includes a common mode filter circuit for reducing common mode noise.

12. A power line communication system for allowing communication between a plurality of communication devices by using an indoor power line, comprising:

an indoor power line;

a communication channel that is branched off from the indoor power line and connectable to a communication device for performing communication by using the indoor power line;

a power supply channel that is branched off from the indoor power line and connectable to electrical equipment that requires electric power;

an impedance matching circuit provided on the power supply channel, for setting an impedance of the indoor power line to a predetermined value;

a filter circuit provided on the power supply channel, for reducing noise occurring from the electrical equipment when the equipment is connected to the power supply channel;

a device connecting part to which the communication device is connected detachably, the device connecting part being provided at an end of the communication channel closer to the communication device; and an equipment connecting part to which the electrical equipment is connected detachably, the equipment connecting part being provided at an end of the power supply channel closer to the electrical equipment.

13. A power line communication system according to claim 12, further comprising an accommodating member for accommodating the communication channel, the power supply channel, the impedance matching circuit, the filer circuit, the device connecting part, and the equipment connecting part.

14. A power line communication system according to claim 13, further comprising a power line connecting part for connecting the communication channel and the power supply channel to the indoor power line detachably.

15. A power line communication system according to claim 12, further comprising:

a first accommodating member for accommodating the communication channel and the device connecting part; and a second accommodating member for accommodating the power supply channel, the impedance matching circuit, the filer circuit, and the equipment connecting part.

16. A power line communication system according to claim 15, further comprising:

a first power line connecting part for connecting the communication channel to the indoor power line detachably; and a second power line connecting part for connecting the power supply channel to the indoor power line detachably.

17. A power line branching apparatus comprising:

a communication channel that is branched off from an indoor power line and connectable to a communication device for performing communication by using the indoor power line;

a power supply channel that is branched off from the indoor power line and connectable to electrical equipment that requires electric power;

an impedance matching circuit provided on the power supply channel, for setting an impedance of the indoor power line to a predetermined value; and a filter circuit provided on the power supply channel, for reducing noise occurring from the electrical equipment when the equipment is connected to the power supply channel, wherein the power supply channel includes two power supply lines, and the impedance matching circuit includes:

a matching impedance element provided between the two power supply lines, for setting the impedance of the indoor power line to a predetermined value when the electrical equipment is not connected to the power supply channel;

a high-pass filter element provided between the two power supply lines, being connected in series to the matching impedance element, for interrupting a frequency component of electric power carried by the indoor power line; and a variation-suppressing impedance element provided on at least either one of the power supply lines at a position closer to the electrical equipment than the matching impedance element and the high-pass filter element are, for suppressing variations in the impedance of the indoor power line resulting from connection of the electrical equipment to the power supply channel.

18. A power line branching apparatus according to claim 17, wherein the matching impedance element is a resistor.

19. A power line branching apparatus according to claim 17, wherein the matching impedance element has a function of preventing overheat resulting from an overcurrent or overpower.

20. A power line branching apparatus comprising:
a communication channel that is branched off from an indoor power line and connectable to a communication device for performing communication by using the indoor power line;
a power supply channel that is branched off from the indoor power line and connectable to electrical equipment that requires electric power;
an impedance matching circuit provided on the power supply channel, for setting an impedance of the indoor power line to a predetermined value; and
a filter circuit provided on the power supply channel, for reducing noise occurring from the electrical equipment when the equipment is connected to the power supply channel,
wherein the power supply channel includes two power supply lines, and the impedance matching circuit includes:
a matching impedance element provided on at least either one of the power supply lines, for setting the impedance of the indoor power line to a predetermined value when the electrical equipment is not connected to the power supply channel, and suppressing variations in the impedance of the indoor power line resulting from connection of the electrical equipment to the power supply channel; and
a high-pass filter element provided between the two power supply lines at a position closer to the electrical equipment than the matching impedance element is, for interrupting a frequency component of electric power carried by the indoor power line.

21. A power line branching apparatus according to claim 20, wherein the matching impedance element is an inductor.

22. A power line branching apparatus comprising:
a communication channel that is branched off from an indoor power line and connectable to a communication device for performing communication by using the indoor power line;
a power supply channel that is branched off from the indoor power line and connectable to electrical equipment that requires electric power;
an impedance matching circuit provided on the power supply channel, for setting an impedance of the indoor power line to a predetermined value; and
a filter circuit provided on the power supply channel, for reducing noise occurring from the electrical equipment when the equipment is connected to the power supply channel,
wherein the power supply channel includes two power supply lines, and the filter circuit includes a shunt circuit provided between the two power supply lines, for reducing normal mode noise occurring from the electrical equipment when the equipment is connected to the power supply channel.

23. A power line branching apparatus according to claim 22, wherein the filter circuit further includes a noise-reducing inductor provided on at least either one of the power supply lines, for reducing normal mode noise occurring from the electrical equipment when the equipment is connected to the power supply channel.

24. A power line branching apparatus comprising:
a communication channel that is branched off from an indoor power line and connectable to a communication device for performing communication by using the indoor power line;
a power supply channel that is branched off from the indoor power line and connectable to electrical equipment that requires electric power;
an impedance matching circuit provided on the power supply channel, for setting an impedance of the indoor power line to a predetermined value;
a filter circuit provided on the power supply channel, for reducing noise occurring from the electrical equipment when the equipment is connected to the power supply channel;
a device connecting part to which the communication device is connected detachably, the device connecting part being provided at an end of the communication channel closer to the communication device; and
an equipment connecting part to which the electrical equipment is connected detachably, the equipment connecting part being provided at an end of the power supply channel closer to the electrical equipment.

25. A power line branching apparatus according to claim 24, further comprising an accommodating member for accommodating the communication channel, the power supply channel, the impedance matching circuit, the filer circuit, the device connecting part, and the equipment connecting part.

26. A power line branching apparatus according to claim 25, further comprising a power line connecting part for connecting the communication channel and the power supply channel to the indoor power line detachably.

27. A power line branching apparatus according to claim 24, further comprising:
a first accommodating member for accommodating the communication channel and the device connecting part; and
a second accommodating member for accommodating the power supply channel, the impedance matching circuit, the filer circuit, and the equipment connecting part.

28. A power line branching apparatus according to claim 27, further comprising:
a first power line connecting part for connecting the communication channel to the indoor power line detachably; and
a second power line connecting part for connecting the power supply channel to the indoor power line detachably.

* * * * *